US011330003B1

(12) United States Patent
Howell et al.

(10) Patent No.: US 11,330,003 B1
(45) Date of Patent: May 10, 2022

(54) ENTERPRISE MESSAGING PLATFORM

(71) Applicant: Wickr Inc., San Francisco, CA (US)

(72) Inventors: Christopher Howell, Freehold, NJ (US); Robert Statica, Long Valley, NJ (US); Kara Lynn Coppa, Long Valley, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 15/812,244

(22) Filed: Nov. 14, 2017

(51) Int. Cl.
H04L 29/06 (2006.01)
G06F 21/57 (2013.01)
G06F 21/55 (2013.01)
H04L 12/58 (2006.01)
H04L 9/08 (2006.01)
G06F 21/31 (2013.01)
H04L 51/18 (2022.01)
H04L 51/046 (2022.01)

(52) U.S. Cl.
CPC .......... H04L 63/1425 (2013.01); G06F 21/31 (2013.01); G06F 21/552 (2013.01); G06F 21/57 (2013.01); H04L 9/0825 (2013.01); H04L 51/046 (2013.01); H04L 51/18 (2013.01)

(58) Field of Classification Search
CPC ... H04L 63/1425; H04L 51/046; H04L 51/18; H04L 9/0825; G06F 21/31; G06F 21/552; G06F 21/57
USPC .......................................................... 726/22
See application file for complete search history.

(56) References Cited

U.S. PATENT DOCUMENTS

| 6,721,784 | B1 * | 4/2004 | Leonard ................. H04L 51/18 709/204 |
| 7,139,399 | B1 | 11/2006 | Zimmermann |
| 7,197,537 | B2 | 3/2007 | Koch |
| 7,383,439 | B2 | 6/2008 | Price et al. |
| 7,412,059 | B1 * | 8/2008 | Pauker ................. H04L 63/0442 380/277 |
| 7,584,505 | B2 | 9/2009 | Mondri et al. |
| 8,175,277 | B2 | 5/2012 | Bell et al. |
| 8,560,843 | B1 * | 10/2013 | Moscaritolo ........ H04L 63/0428 713/162 |
| 8,601,114 | B1 | 12/2013 | Cooper |
| 8,631,227 | B2 | 1/2014 | Olechowski et al. |
| 8,837,717 | B1 * | 9/2014 | Thorpe ................. H04L 51/18 380/44 |
| 8,863,226 | B1 | 10/2014 | Bailey et al. |

(Continued)

OTHER PUBLICATIONS

Callas et al. "OpenPGP Message Format." RFC 4880, Nov. 2007.

Primary Examiner — Aravind K Moorthy
(74) Attorney, Agent, or Firm — Davis Wright Tremaine LLP

(57) ABSTRACT

A secure messaging platform for an enterprise environment is disclosed. The secure messaging platform enables users to exchange encrypted communications. Further, the secure messaging platform allows enterprise platforms to review the encrypted communications to ensure that they comply with company policies. Messages that comply with company policies may be provided to their intended recipients, while messages that fail to comply with company policies are not provided to their intended recipients. Additionally, the encrypted communications may be retained for a predetermined time.

17 Claims, 26 Drawing Sheets

(56) References Cited

U.S. PATENT DOCUMENTS

| | | | |
|---|---|---|---|
| 8,935,523 B1* | 1/2015 | Osburn, III | H04L 9/0838 713/153 |
| 8,954,605 B1* | 2/2015 | Hecht | H04L 51/18 709/245 |
| 9,083,509 B2 | 7/2015 | Buckley et al. | |
| 9,130,822 B2 | 9/2015 | Cooper | |
| 9,305,161 B1* | 4/2016 | Juels | G06F 21/31 |
| 9,621,584 B1* | 4/2017 | Schmidt | H04L 41/0803 |
| 9,660,970 B1* | 5/2017 | Rubin | H04L 9/0825 |
| 9,866,591 B1* | 1/2018 | Statica | G06F 21/6218 |
| 10,616,162 B1* | 4/2020 | Zhao | H04L 51/10 |
| 2003/0188196 A1* | 10/2003 | Choi | H04L 63/145 726/24 |
| 2004/0205248 A1* | 10/2004 | Little | H04L 9/3247 709/246 |
| 2005/0071643 A1* | 3/2005 | Moghe | G06F 21/552 713/182 |
| 2005/0160292 A1 | 7/2005 | Batthish et al. | |
| 2005/0273851 A1* | 12/2005 | Raju Datla | H04L 63/1425 726/14 |
| 2006/0168064 A1* | 7/2006 | Huynh | G06Q 10/107 709/206 |
| 2006/0277341 A1* | 12/2006 | Johnson | G06F 21/629 710/200 |
| 2007/0022469 A1 | 1/2007 | Cooper et al. | |
| 2007/0043842 A1* | 2/2007 | Chouanard | H04L 67/1008 709/223 |
| 2007/0056046 A1* | 3/2007 | Claudatos | G06F 21/57 726/28 |
| 2007/0245031 A1* | 10/2007 | Liu | H04L 63/145 709/229 |
| 2008/0019530 A1 | 1/2008 | Eldridge et al. | |
| 2008/0065878 A1 | 3/2008 | Hutson et al. | |
| 2008/0170689 A1 | 7/2008 | Boubion et al. | |
| 2008/0262990 A1* | 10/2008 | Kapoor | H04L 63/1408 706/20 |
| 2009/0006851 A1 | 1/2009 | Freeman et al. | |
| 2009/0070466 A1 | 3/2009 | Elbring | |
| 2009/0097662 A1 | 4/2009 | Olechowski et al. | |
| 2009/0281829 A1 | 11/2009 | Hansen et al. | |
| 2010/0037324 A1* | 2/2010 | Grant | G06F 21/554 726/27 |
| 2010/0138934 A1 | 6/2010 | Minoshima | |
| 2010/0205657 A1* | 8/2010 | Manring | G06F 21/57 726/5 |
| 2010/0250691 A1* | 9/2010 | Tomkow | H04L 51/18 709/206 |
| 2011/0035591 A1 | 2/2011 | Dudziak et al. | |
| 2011/0119730 A1* | 5/2011 | Eldar | G06F 21/554 726/1 |
| 2011/0247074 A1* | 10/2011 | Manring | G06F 21/57 726/26 |
| 2011/0296001 A1* | 12/2011 | Ramstrom | G06F 21/604 709/224 |
| 2012/0219003 A1* | 8/2012 | Cui | H04L 43/0817 370/395.5 |
| 2012/0254616 A1* | 10/2012 | Brown | H04L 9/0825 713/171 |
| 2013/0208620 A1* | 8/2013 | Kaufman | H04L 12/185 370/254 |
| 2013/0275842 A1 | 10/2013 | Peach | |
| 2013/0291087 A1* | 10/2013 | Kailash | H04L 63/1425 726/11 |
| 2013/0326221 A1* | 12/2013 | Murphy | H04L 63/123 713/168 |
| 2014/0032682 A1* | 1/2014 | Prado | H04L 51/14 709/206 |
| 2014/0052989 A1* | 2/2014 | Jones | G06F 21/85 713/171 |
| 2014/0143831 A1* | 5/2014 | Fieweger | G06F 21/64 726/3 |
| 2014/0181221 A1 | 6/2014 | Kushtagi et al. | |
| 2014/0208391 A1* | 7/2014 | Farnsworth | H04L 63/104 726/4 |
| 2014/0289794 A1* | 9/2014 | Raleigh | G06F 21/575 726/1 |
| 2014/0298021 A1* | 10/2014 | Kwon | H04L 1/1809 713/168 |
| 2014/0317681 A1* | 10/2014 | Shende | H04L 63/10 726/1 |
| 2015/0039882 A1 | 2/2015 | Watanabe | |
| 2015/0039889 A1* | 2/2015 | Andoni | H04L 9/0825 713/170 |
| 2015/0073980 A1* | 3/2015 | Griffin | G06Q 30/00 705/39 |
| 2015/0082460 A1* | 3/2015 | Amiga | H04L 63/145 726/28 |
| 2015/0088999 A1* | 3/2015 | Carr | H04L 67/02 709/206 |
| 2015/0121549 A1 | 4/2015 | Baessler et al. | |
| 2015/0154206 A1 | 6/2015 | Sanjeev et al. | |
| 2015/0163199 A1* | 6/2015 | Kailash | H04L 63/1425 726/11 |
| 2015/0350036 A1 | 12/2015 | Cooper | |
| 2015/0350250 A1* | 12/2015 | Brander | H04L 63/205 726/1 |
| 2015/0350902 A1* | 12/2015 | Baxley | H04W 12/122 726/7 |
| 2016/0078225 A1* | 3/2016 | Ray | G06F 21/56 726/23 |
| 2016/0269440 A1* | 9/2016 | Hartman | H04L 9/14 |
| 2016/0277447 A1* | 9/2016 | Pope | H04L 63/20 |
| 2016/0301735 A1* | 10/2016 | Lind | H04L 67/2895 |
| 2016/0308812 A1* | 10/2016 | Johnstone | H04L 51/08 |
| 2016/0359740 A1* | 12/2016 | Parandehgheibi | G06F 16/137 |
| 2016/0380937 A1* | 12/2016 | Murphy | H04L 51/08 709/206 |
| 2017/0026348 A1* | 1/2017 | Martinez | G06F 21/606 |
| 2017/0063688 A1* | 3/2017 | Huang | H04L 45/306 |
| 2017/0099604 A1* | 4/2017 | Raleigh | H04L 41/046 |
| 2017/0141961 A1* | 5/2017 | Cao | H04L 41/0869 |
| 2017/0244689 A1* | 8/2017 | Cetlur | G06F 21/316 |
| 2017/0288871 A1* | 10/2017 | Dimitrakos | G06F 21/602 |
| 2017/0300349 A1* | 10/2017 | Shaw | G06F 9/45533 |
| 2017/0300472 A1* | 10/2017 | Parikh | G06F 17/2705 |
| 2017/0302679 A1* | 10/2017 | Caramico | H04L 67/306 |
| 2017/0346625 A1* | 11/2017 | Yan | G06F 21/602 |
| 2017/0359370 A1* | 12/2017 | Humphries | H04L 63/10 |
| 2017/0359378 A1* | 12/2017 | Reitsma | G06F 9/45558 |
| 2018/0165310 A1* | 6/2018 | Coll | G06F 21/6227 |
| 2018/0191655 A1* | 7/2018 | Girdhar | H04L 51/34 |
| 2018/0198627 A1* | 7/2018 | Mullins | H04L 9/0877 |
| 2018/0260578 A1* | 9/2018 | Orloff | G06F 21/53 |
| 2019/0020631 A1* | 1/2019 | Leavy | H04L 63/062 |
| 2019/0020632 A1* | 1/2019 | Leavy | H04L 63/0442 |

* cited by examiner

ENTERPRISE MESSAGING PLATFORM

CROSS-REFERENCE TO RELATED APPLICATIONS

This application is a continuation of U.S. application Ser. No. 14/811,765, filed on Jul. 28, 2015 and entitled "Enterprise Messaging Platform," which is continuation-in-part of U.S. application Ser. No. 14/314,018, filed on Jun. 26, 2013 and entitled "Secure Time-to-Live," which claims priority to U.S. Provisional Patent Application No. 61/846,568, entitled "Digital Security Bubble," filed Jul. 15, 2013; U.S. Provisional Patent Application No. 61/943,826, entitled "Enhanced Perfect Forward Secrecy For Multi-Synchronous Communication," filed Feb. 24, 2014; and U.S. Provisional Patent Application No. 62/032,997, entitled "Enterprise Messaging Platform," filed on Aug. 4, 2014, all of which are incorporated herein by reference in their entirety.

This application also claims priority to U.S. Provisional Patent Application No. 62/032,997, entitled "Enterprise Messaging Platform," filed on Aug. 4, 2014, which is incorporated herein by reference in its entirety.

BACKGROUND

Companies today are faced with the challenge of providing tools to support an increasingly mobile workforce while under obligations to protect data and meet legal requirements for securing consumer information. Enterprises who value the privacy and secrecy of their sensitive communications should consider who sits in the middle of their electronic communications. Between foreign governments and infrastructure providers, the opportunity to capture unprotected text messages, phone calls, and emails deliberately is real. Absent viable solutions from the enterprise, employees will inevitably choose consumer grade tools that will undermine these obligations.

Unfortunately, existing approaches to securing communications can be difficult and/or cumbersome to use. As one example, some approaches to data security make use of digital certificates or keys, or pre-shared passwords, which can be tedious to manage. Further, existing approaches are often susceptible to interception (e.g., eavesdropping and man-in-the middle attacks), forensic analysis, and impersonation.

Thus, there is a need for a secure communications tool for enterprises that can help them comply with statutes and regulations for securing their data and their consumer's information.

BRIEF SUMMARY

The present application describes a secure messaging platform for companies to help them comply with statutory and regulatory obligations for protecting consumer information.

According to one embodiment of the present disclosure, a system that includes a processor and a memory. The memory includes instructions that cause the processor to receive an encrypted digital security bubble encapsulation from a sender. The encrypted digital security bubble encapsulation may include an encrypted message and an encrypted first key. The processor then decrypts the encrypted digital security bubble encapsulation and the encrypted first key. Using the decrypted first key, the processor may decrypt the encrypted message. Next, the processor may analyze the decrypted message to determine whether it is compliant with corporate policies. If the message complies with the corporate policies, the processor may provide the encrypted digital security bubble encapsulation to the intended recipients. If the message does not comply with corporate policies, then the message is blocked from delivery.

Another aspect of the disclosure describes a method that includes receiving an encrypted digital security bubble encapsulation and decrypting the encrypted digital security bubble encapsulation. The encrypted digital security bubble encapsulation includes an encrypted message and an encrypted first key. The method proceeds to decrypt the encrypted first key and decrypting the encrypted message using the first key. The decrypted message is analyzed to determine whether it is compliant with corporate policies. If the message complies with the corporate policies, the method may provide the encrypted digital security bubble encapsulation to the intended recipients. If the message does not comply with corporate policies, then the method blocks the message from delivery.

The present application also describes a computer program product embodied on a non-transitory computer readable storage medium. The computer program product includes instructions for receiving an encrypted digital security bubble encapsulation from a sender. The encrypted digital security bubble encapsulation includes an encrypted message and an encrypted first key. The computer program product also includes instructions for decrypting the encrypted digital security bubble encapsulation and the encrypted first key in the encrypted digital security bubble encapsulation. The computer program product includes instructions to use the decrypted first key to decrypt the encrypted message. The computer program product includes that analyzing the decrypted message to determine whether it is compliant with corporate policies. If the message complies with the corporate policies, the instructions provide the encrypted digital security bubble encapsulation to the intended recipients. If the message does not comply with corporate policies, then the instructions block the message from delivery.

Another aspect of the current disclosure describes a system that includes a compliance server, a retention server, and a secure messaging platform. The secure messaging platform facilitates the exchange of encrypted communications between client devices. In order to facilitate exchange of encrypted communications, the secure messaging platform includes interfaces to enable communications between client devices, a compliance engine to analyze communications to determine whether they comply with corporate policies, and an audit controls module to record and examine encrypted communications to determine whether a security violation has occurred. The compliance server may communicate with the compliance engine. Further, the retention server may store communications exchanged via the secure messaging platform.

BRIEF DESCRIPTION OF THE DRAWINGS

Various embodiments of the invention are disclosed in the following detailed description and the accompanying drawings.

DETAILED DESCRIPTION

Figure 1:
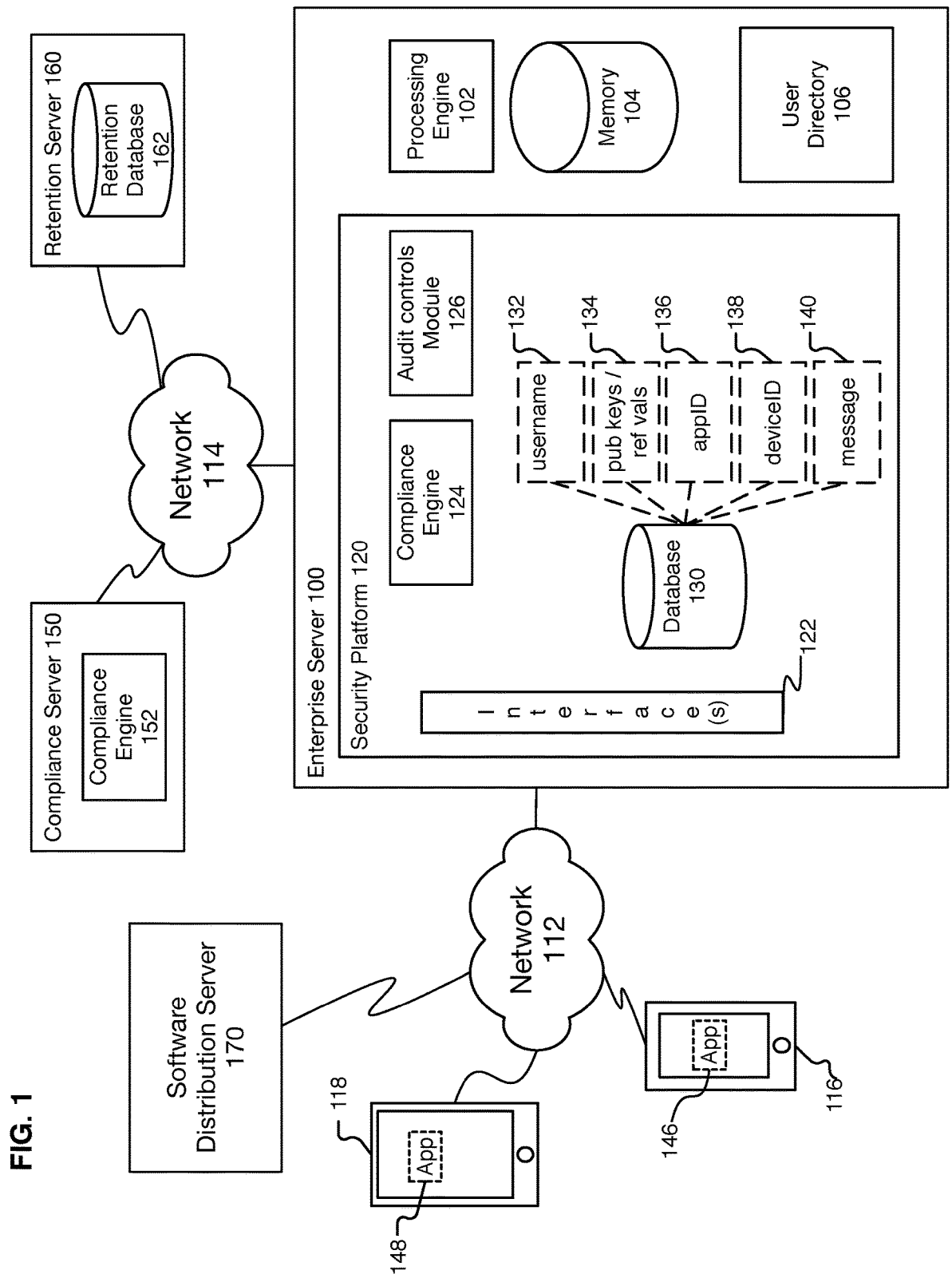
FIG. 1 illustrates an embodiment of an enterprise environment in which the exchange of secure communications is facilitated by a security platform.

The present application describes a secure messaging platform for companies to help them comply with statutory and regulatory obligations for protecting consumer information.

In this regard, statutes and regulations have been passed that define safeguards that companies should implement to ensure the safety of their consumer information. For instance, companies in the healthcare industry are required to implement access control mechanisms, authentication mechanisms, audit controls, integrity measures, and encryption mechanisms to protect patient healthcare information. According to another example, regulations in the financial sector require that financial institutions maintain correspondence and communications for a predetermined period of time (e.g., 7 years).

Accordingly, the secure messaging platform described herein easily integrates into existing enterprise systems to provide an additional layer of security. The secure messaging platform may include mechanisms to encrypt information, both in transit and at rest. Additionally, the secure messaging platform may verify that a person or entity seeking access to an account or information is who he or she claims to be before providing access to the account or information. The secure messaging platform may also include mechanisms that allow for administrators to integrate into existing identity systems and define roles that provide users, programs, and other entities with access to information based on their defined role. Further, the secure messaging platform may take reasonable steps to release user's personal information only to service providers and third parties who are capable of maintaining the confidentiality, security, and integrity of such information, and who provide assurances that they will maintain the information in such a manner.

The secure messaging platform may include an retention database for maintaining communications. Alternatively, the retention database may be a third party that the secure messaging platform interfaces with. In this regard, audit controls may also be included in the secure messaging platform to allow messages maintained in the retention database to be searched and recovered.

Additionally, the secure messaging platform may include a compliance engine configured to detect potential data breaches and/or data ex-filtration transmissions and prevent them by monitoring, detecting and blocking sensitive data while in-motion. Alternatively, the secure messaging platform may interface with a compliance server or an external compliance engine or data leakage prevention ("DLP") engine, which will analyze and review messages with respect to the enterprise's data usage policies. As used herein compliance engine and DLP engine may be used interchangeably. Accordingly, the compliance engine may forward messages to a retention database that retains messages transmitted using the secure messaging platform. Messages that do not comply with the company's data usage policies or federal and/or state laws and/or regulations may be flagged in the retention database for further review. In some embodiments, the retention database may be a third party database that the secure communications platform interfaces with.

In operation the compliance engine may review a sender's message before it is sent to ensure that it complies with the company's policies. If the message complies with the company's policies, the compliance engine will send an authorization to the sender indicating that the message may be sent. If the message does not comply with the company's policies, the compliance engine will indicate that the sender cannot transmit the message. According to some embodiments, the compliance engine may send a command to the sender that destroys the message such that it cannot be sent. Alternatively, the sender's secure messaging instance may automatically copy the compliance engine. Accordingly, the compliance engine may decrypt the message and analyze the message to determine whether it complies with company policies. If the message complies with company policies, then the compliance engine may forward the message to a retention server. If the message fails to comply with company policies, the compliance engine may provide a notification to a compliance officer and store the message in a retention database.

The embodiments described herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A. Security Platform

FIG. 1 illustrates an embodiment of an enterprise environment in which the exchange of secure communications is facilitated by security platform 120. In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients (as applicable)—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform 120 is unable to decrypt messages. Users of embodiments of platform 120 (or administrators associated with those users, as applicable) can control who is cable of communicating with them, using privacy lists, described in more detail below. As will further be described in more detail below, using the techniques described herein, message participants can maintain a forward secret secure messaging channel, whether communicating synchronously (e.g., where all participants are online or otherwise able to communicate with platform 120) and asynchronously (e.g., where at least one participant is offline or otherwise not in communication with platform 120).

As shown in FIG. 1, security platform 120 may be implemented on enterprise server 100. Enterprise server 100 may be a stand-alone server, a corporate server, or a server located in a server farm or cloud-computing environment. In some embodiments, the enterprise server 100 may be a virtual machine configured to provide the secure platform 120 to the enterprise.

Enterprise server may include a processing engine 102, memory 104, user directory 106, and the security platform 120. Processing engine 102 may be any conventional processor capable of interacting memory 104, user directory 106, and security platform 120. In this regard, processing engine 102 may include a processor, multiprocessor, multicore processor, or any combination thereof. Alternatively, the processor may be a dedicated controller such as an Application Specific Integrated Circuit (ASIC) or Field Programmable Gate Array (FPGA).

Memory 104 stores information accessible by processing engine 102, including instructions and data that may be executed or otherwise used by the processor 102. The memory 104 may be of any type capable of storing information accessible by the processor, including a non-transitory computer-readable medium, or other medium that stores data that may be read with the aid of an electronic device, such as a hard-drive, solid state drive, memory card, flash drive, ROM, RAM, DVD or other optical disks, as well as other write-capable and read-only memories. Memory 104 may include short term or temporary storage as well as long term or persistent storage. According to some embodiments, memory 104 may include a storage area network (SAN) accessible by the enterprise server 100.

User directory 106 may be any database or table capable of providing directory services. For example, user directory may include a corporate directory that include users first and last names, their usernames, email address, phone numbers, department information, etc. Additionally, the user directory 106 may be used to share information about users, systems, networks, services and applications. According to some embodiments, the user directory 106 may include a Lightweight Directory Access Protocol (LDAP). In some embodiments, user directory 106 may also include a table of hashed usernames, a table of appIDs 136, and a table of deviceIDs.

Although FIG. 1 illustrates processing engine 102, memory 104, and user directory 106 as being located on enterprise server 100, it will be understood by those of ordinary skill in the art that the processing engine and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors or computers or memories that may or may not operate in parallel. Further, the user directory 106 may be located in a separate physical housing from processing engine 102 and memory 104.

Security platform 120 may be configured to facilitate the exchange of communications between enterprise clients and devices. Further, security platform 120 may be configured to allow enterprise clients and devices to communicate with users of the security platform external to the enterprise environment.

As used herein, "communications" and "messages" may take a variety of forms, including: text messages, e-mails, documents, audiovisual files, Short Message Service messages (SMSes), voice calls (i.e., VOIP), and video calls. Additionally, the content of the messages and/or communications may pertain to electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Security platform 120 may provide encrypted messaging that easily integrates and secures existing systems while providing compliant, secure supervision and archival of enterprise-related messaging. In this regard, security platform may integrate with existing identity systems, such as user directory 106. Further, security platform may include built-in support for enterprise data retention and support systems.

In this regard, security platform 120 may include a compliance engine 124, an audit controls module 126, a database 130, and one or more interface(s) 122 for communicating with client devices 116, 118.

Compliance engine 124 may be capable of analyzing communications transmitted between users to ensure that messages comply with the company's policies related to electronic communication. Alternatively, the compliance engine 124 may include an interface for interacting with the compliance server 150 through network 114. Network 114 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

The compliance server 150 may include its own processor (not shown), memory (not shown), and compliance engine 152. Compliance engine 152 may analyze transmitted communications for compliance with corporate policies. Alternatively, compliance engine 152 may be used to update corporate policies with regard to electronic communications and transmit updates to the compliance engine 124, for example, by pushing updates to compliance engine 124.

According to some embodiments, the compliance server 150 may store messages in the retention database 162 after the compliance verification is performed. That is, compliance server 150 may communicate with retention server 160, via network 114, in order to store messages.

While compliance server 150 is illustrated as being a separate server from enterprise server 100, one of ordinary skill in the art would recognize that compliance server 150 and enterprise server 100 may be co-located on the same physical device. Alternatively, compliance server 150 and enterprise 100 may be located in the same server farm or in the same corporate network. In some embodiments, compliance server 150 may be a virtual compliance server ("VCS") that may provide compliance verification in a virtual environment.

Audit controls module 126 may be capable of recording and examining activity in the security platform 120 to determine whether a security violation has been detected. Additionally, audit controls module 126 may include an interface, such as an API, that allows the enterprise server 100's existing audit controls to integrate and communicate with security platform 120. Alternatively, audit controls module may include an interface, such as an API, that interacts existing audit controls already present in the enterprise environment.

Audit controls module 126 may also communicate with retention server 160, via network 114, to store messages communicated via security platform 120. In this regard, retention server 160 may store messages in retention database 162. Retention server 160 may encrypt the messages stored in retention database 162 using a key that is unique to the retention database 162. Further, retention database 162 may include a time-to-live field that defines how long each individual message is to be retained. After expiration of the time-to-live, the messages stored in the retention database may forensically deleted. The time-to-live option is discussed in greater detail below.

In preferred embodiments, audit controls module 126 may also interface with retention database 162 to search stored message in response to possible security or compliance violations. While retention server 160 is illustrated as being a separate server from enterprise server 100, one of ordinary skill in the art would recognize that retention server 160 and enterprise server 100 may be co-located on the same physical device. Alternatively, retention server 160 and enterprise 100 may be located in the same server farm or in the same corporate network. Further, one of ordinary skill in the art would recognize that retention database 162 may be stored in memory 104.

Security platform 120 may also include database 130. Database 130 may be a relational database that stores information in a variety of tables, including a table of hashed usernames 132, a table of public keys and reference values 134, a table of appIDs 136, a table of deviceIDs 138, and a table of messages 140. Accordingly, database 130 may include a record for each user of platform 120 to allow users to find other users and communicate with other users. Each record may include the user's public key pool and associated reference values, deviceID(s), appID(s), privacy mode and privacy list entries, and messages. While a database is shown in FIG. 1, other techniques can be used to store the information used by platform 120 to facilitate exchange of messages. For example, messages can be stored in a separate storage 104 instead of being stored within database 1130. As will be described in more detail below, additional information can be securely stored on platform 120, whether in database 130 or another appropriate location, such as user verification information and user verification settings.

Security platform 102 includes one or more interface(s) 118 for communicating with client devices 116 and 118. As one example, platform 120 may provide an application programming interface (API) configured to communicate with apps installed on client devices, such as app 116 and app 148. Platform 120 may also provide other types of interfaces, such as a web interface, or stand alone software programs for desktops and laptops, running on various Operating Systems (OSes). The web interface can allow users of client devices to exchange messages securely (whether with one another or other users), without the need for a separately installed messaging application. The stand alone software program may allow users to exchange secure messages via software that is downloaded by each user as disused in greater detail below. As will be discussed in more detail below, platform 120 may make available a master clock time available via one or more interface(s) 122. The master clock time may be used by client apps to enforce secure time-to-live (TTL) values of messages. The TTL values can be used to enforce (e.g., on behalf of a message sender) time constraints on message access (e.g., by a recipient).

Users of client devices, such as client devices 116 and 118, may communicate securely with one another using techniques described herein. As shown in FIG. 1, client devices 116 and 118 may be mobile devices, such as a smart phone or tablet. However, in some embodiments, client devices 116 and 118 may include laptop computer, desktop computers, virtual machines, etc.

The client devices 116, 118 may make use of the techniques described herein via a messaging application (also referred to as an "app") 146, 148, respectively. According, messaging app 146 and 148 may include an authentication module (not shown). In this regard, users of the messaging app may have to enter a user name and password that the authentication module will use to verify the user before the user accesses secure platform 120. Additionally, each user may have different instances of the messaging app across multiple devices. That is, the user of device 116 may be able to receive messages on both device 116 in addition to a laptop that has a copy of the app.

In some embodiments, client devices 116, 118 may be the users' personal devices (i.e. a bring your own device (BYOD) scenario). In this regard, the messaging app 146, 148 may be obtained from an enterprise server and installed by the user or an administrator of the enterprise network. For example, client devices 116, 118 may access security platform 120 via an interface 122 to obtain and install the messaging application on devices 116, 118.

Alternatively, the messaging app 146, 148 may be obtained from a software distribution server 170. The software distribution server 170 may be a single server or multiple servers, such as a server farm or a cloud computing service, that is capable of providing software to devices. For example, software distribution server 170 may cooperate with app stores (not shown), such as those provided by Apple, Google, Blackberry, Microsoft, Amazon, and/or other entities, or other web servers capable of providing apps and/or other software via downloads. Other types of devices not depicted in FIG. 1 can also be used in conjunction with the techniques described herein, such as game consoles, camera/video recorders, video players (e.g., incorporating DVD, Blu-ray, Red Laser, Optical, and/or streaming technologies), smart TVs, and other network-connected appliances, as applicable.

In other embodiments, client devices 116, 118 may include enterprise resources, such as a company laptop or desktop computer. In this regard, messaging app 146, 148 may be installed on the client device before being distributed to users.

Communications between users of client devices 116, 118 may be exchanged via network 112. Network 112 may be any network, or combination of networks, as discussed above with respect to network 114.

As will be described in more detail below, processing engine 102 may perform a multitude of tasks on behalf of security platform 120. For example, platform 120 may designate one of the keys in a pool of public keys received from a user of device 116 as a "reserve" key. Another task performed by platform 120 may include facilitating the addition of new keys to a user's key pool as the keys are used. Yet another task performed by platform 120 may be include dynamically adjusting the size of a user's key pool as needed. Yet another task performed by platform 120, in various embodiments, is confirming whether mutual privacy settings permit a given user to communicate with another user and providing keys for communications only where privacy settings permit.

Whenever platform 120 is described as performing a task, either a single component or a subset of components or all components of platform 120 or enterprise server 100 may cooperate to perform the task. Similarly, whenever a component of platform 120 is described as performing a task, a subcomponent may perform the task and/or the component may perform the task in conjunction with other components.

Further, multiple embodiments of platform 120 may exist simultaneously in an environment (with those multiple embodiments operated by a single entity, or different entities) with the techniques described herein adapted as applicable. For example, platform 120 can be operated by a non-profit organization (or an individual, a company, or any other appropriate type of entity or set of entities) for use by the general public (e.g., with arbitrary members of the public able to use platform 120 to exchange communications). As another example, an enterprise organization can operate an embodiment of platform 120 exclusively for use by the employees of the enterprise (and, as applicable, other individuals, such as vendors). As yet another example, a company (or other entity or entities) can operate one or multiple instances of platform 120 on behalf of multiple organizations, such as small business or companies, schools, charitable organizations, etc.

B. Installation/Initialization/Registration

Suppose a user of client device 116 (hereinafter referred to as "Alice") would like to send a secure message to her friend, Bob (a user of client device 118) in accordance with techniques described herein. In some embodiments, in order to send a message to Bob, Alice first obtains a copy of a messaging application suitable for her device. For example, if Alice's tablet device runs iOS, she could obtain an "app" for her tablet or mobile phone from the Apple App Store (an example of software distribution server 170). Bob similarly obtains an appropriate application suitable for his client device 118 (e.g., an Android-based smartphone) from an appropriate location (e.g., the Google Play store or Amazon Appstore). In some embodiments, client devices make use of a web-based application (e.g., made available by platform 120 through interface 122), instead of, or in addition to, a dedicated installed application.

In embodiments where platform 120 is operated on behalf of specific groups of individuals (e.g., on behalf of employees of a company, students/teachers at a school, company stockholders, members of a club, premium customers, etc.), the app can be obtained from a publicly accessible software distribution server as Alice and Bob do above (e.g., from the Google Play store), can be obtained from a privately operated software distribution server (e.g., made available only to company-issued devices or devices otherwise authorized to communicate with the private server), can be provisioned by support personnel associated with the group (e.g., by being directly installed by the support personnel or included in a device image), etc., as applicable. For example, suppose an embodiment of platform 120 is operated by ACME University on behalf of its students and faculty/staff. As mentioned above, the university can itself operate an embodiment of platform 120, or can contract with a third party to make available the embodiment of platform 120 for university users. Freshmen (and other new students/employees, as applicable) at ACME University can be provided with instructions for downloading and installing an ACME University-specific embodiment of the secure messaging application from a university server in conjunction with their new student orientation. As another example, new employees of Beta Corporation can be issued company phones (and/or other devices such as laptops) with an embodiment of the secure messaging application pre-installed and pre-configured by support personnel for Beta Corporation (e.g., where Beta Corporation operates an embodiment of platform 120 on behalf of its employees and business partners). As yet another example, business partners of Beta Corporation (e.g., vendors) can be provided with instructions for provisioning a Beta Corporation-specific embodiment of the secure messaging application via email, or via a website. And, the Beta Corporation-specific embodiment of the secure messaging application can be made available via email, a website, or any other appropriate mechanism.

Figure 2A:
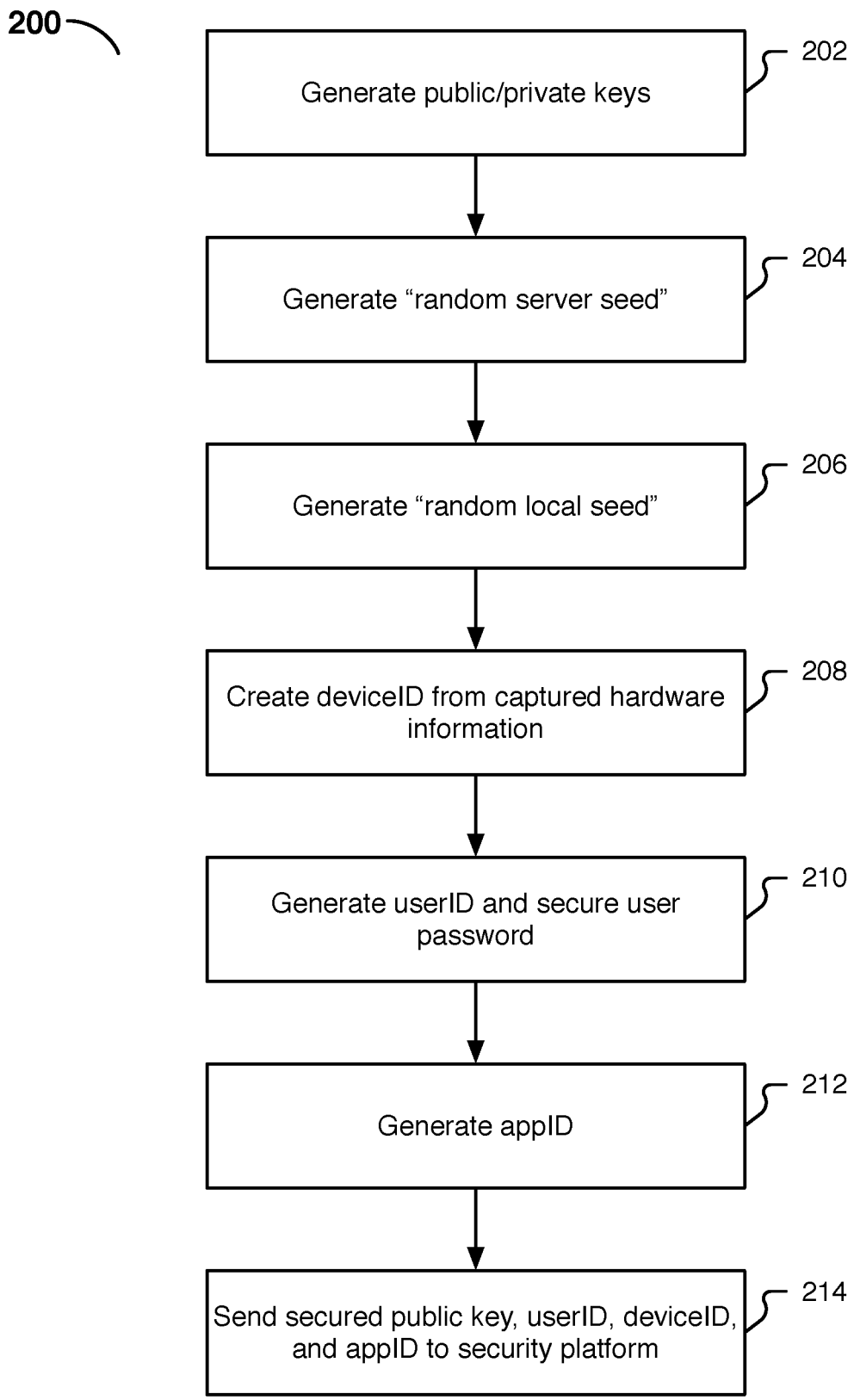
FIG. 2A illustrates an embodiment of an installation and registration process.
Figure 2B:
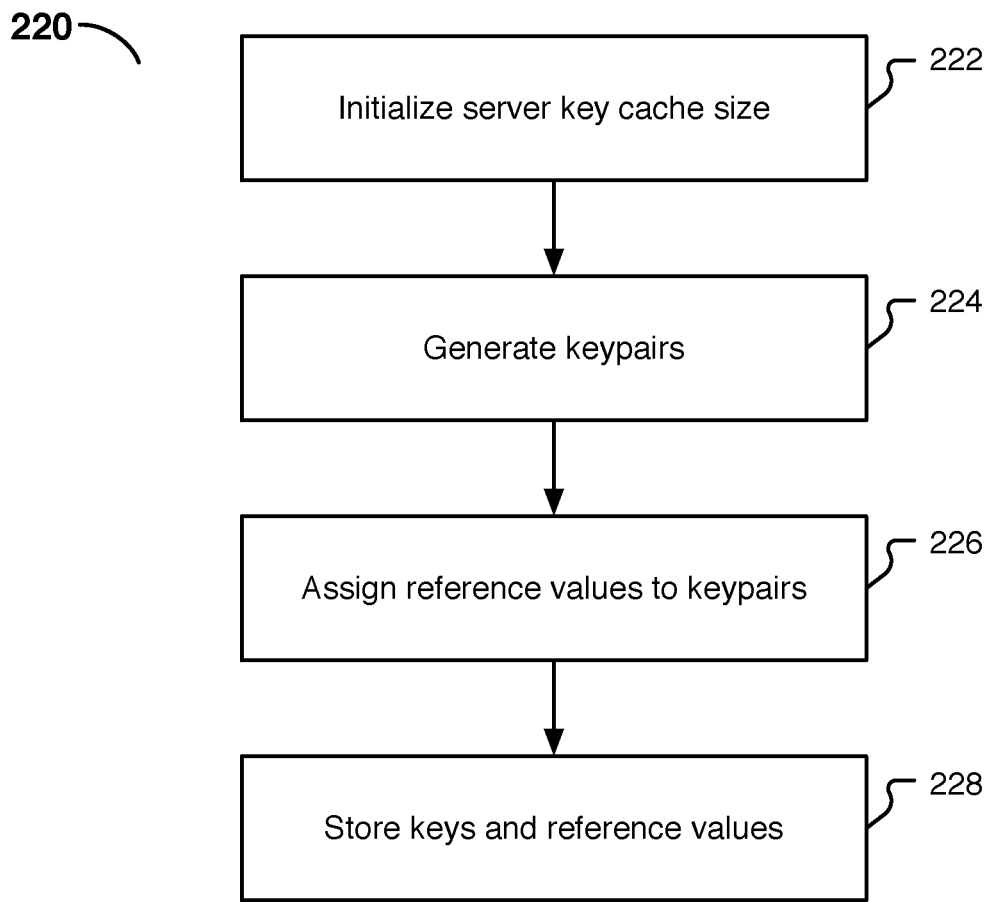
FIGS. 2B and 2C illustrates processes for generating a pool of keypairs.

Returning to the example of Alice (a member of the public, using an embodiment of platform 120 made available to the public), once Alice's tablet 116 has obtained a copy of the secure messaging app, the app is installed, and Alice is able to register for an account. An instance of a messaging app usable in conjunction with the techniques described herein is depicted in FIG. 1 as app 146 (installed on device 116). Examples of events that can occur during an installation/initialization/registration process (200) are illustrated in FIGS. 2A and 2B and will now be described. While the events will be described in one order, events can also be performed in other orders and/or in parallel (instead of in sequence) in other embodiments. Further, various events can be added or omitted, in some embodiments, as applicable. For example, where an embodiment of platform 120 is made available by an enterprise for use by its employees (or a school on behalf of its student/staff/faculty, etc.), account creation and initialization may at least partially be performed by support personnel (and/or may be performed at least partially in an automated manner based on a new employee/member workflow), instead of being performed by an end user. As a further example, administrators (e.g., in the school or enterprise scenarios) can pre-configure privacy list information (described in more detail below) on behalf of users.

In some embodiments, process 200 is performed on a client device, such as Alice's client device 116. The process begins at 202 when a pool of public/private keypairs for the application is generated, on client device 116 (e.g., using RSA, ECDH, or any other appropriate asymmetric encryption algorithms). As one example, the keypairs can be generated using Eliptic Curve Algorithm with Diffie Helman Key Exchange (ECDH). Other cryptographic standards can also be used, such as RSA. In some embodiments, the keypairs are randomly seeded. As will be described in more detail below, each message Alice sends (whether to Bob or anyone else) can be encrypted with a unique, random key that is used only once then destroyed forensically by Alice (the sender's) device. The forensic destruction ensures that the deleted keys cannot be recovered from Alice's device, even via digital forensics methods.

FIG. 2B illustrates an embodiment of a process for generating a plurality of public/private keypairs. In some embodiments, process 220 is performed on a client device (such as client device 116) as part of step 202 of process 200. Process 220 begins at block 222 when the pool size associated with the client device is initialized. As one example, a default pool size of fifty keys is received as a parameter from platform 120 by application 146. The pool size can also be encoded into application 146 or otherwise provided to device 116 (e.g., configured via an enterprise administrator, where platform 120 is operated on behalf of an enterprise) without requiring the server to transmit the initial pool size. As will be explained in more detail below, the pool size associated with a device can be dynamically adjusted, for example, such that a device (e.g., of a heavy user that is frequently offline) that initially has a pool size of 50 keys can have the size adjusted upward to a pool size of 200 keys (or more).

At block 224, a pool of keys (i.e., a number of keypairs equal to the size initialized at 222) is generated on client device 116. As mentioned above, the keypairs can be generated using Eliptic Curve Algorithm with Diffie Helman Key Exchange (ECDH). Other cryptographic standards can also be used, such as RSA.

In block 226, a reference value is assigned for each of the respective keypairs. As one example, suppose fifty keypairs are generated at block 224 of process 220. At block 226, fifty respective reference values are assigned to each of the respective keypairs. The reference values will be used to distinguish the various keys in the pool of keys from one another and can be assigned to the keypairs in a variety of ways. As one example, a six digit random number can be generated by device 116 as the first reference value for the first keypair, and each subsequent reference value can be selected as an increment of the first reference value. As another example, every reference value can be randomly selected. Other schemes for selecting/assigning reference values can be employed at block 226 as applicable.

The private keys and reference values are stored (e.g., in a secure database residing on device 116) in block 228. As will be described in more detail below, the corresponding public keys will be transmitted to platform 120 (along with the associated reference values) and platform 120 will designate one of the public keys in the pool as a reserve key as noted above.

Returning to FIG. 2A, a "random server seed" is generated at block 204. In block 206, a "random local seed" is generated. The seeds are used in conjunction with cryptographic key generation, and in some embodiments, the seeds are determined based on captured hardware information (described in more detail below).

In block 208, a device identifier ("deviceID") is created from captured hardware information, including, for example, hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

In block 210, Alice is asked, via an interface provided by app 146, to supply a desired username. Alice enters "Alice" into the interface. A determination is made as to whether the username is available. As one example, app 146 can supply a cryptographic hash of "Alice" to platform 120 for checking. If platform 120 does not already have a record for that hash, the username "Alice" is available for Alice to use. If platform 120 already has a record of that hash, Alice is instructed by the interface to pick an alternate username. Once Alice has selected an available username, she is asked to supply a password.

As mentioned above, in some embodiments, portions of process 200 may be omitted (or performed by other entities, as applicable). In this regard, the userID portion of block 210 may be skipped for enterprise environments. For example, where a university student at ACME University is establishing an account to use an ACME University-specific embodiment of platform 120, the user's name may be preselected or otherwise issued by the University, rather than being selected by the user. Similarly, in a corporate environment, a user's corporate identity or email address may be used as the user ID for the corporate-version of platform 120.

In block 212, an application identifier ("appID") may be created. The appID is a unique identifier for the particular installation of the messaging app. If Alice installs the messaging app on multiple devices, each of her devices will have its own unique appID. Similarly, each of her devices may also have its own unique deviceID. In some embodiments, the appID may be created by hashing Alice's selected password and other information, such as device information.

Finally, in block 214, Alice's public keys (and reference values), deviceID, and appID are sent to platform 120 in a secure manner. As one example, in some embodiments app 146 may be configured to communicate with platform 120 via TLS.

At the conclusion of process 200, Alice is ready to send and receive secure communications.

As mentioned above, alternate versions of processes 200 and/or 220 can be used in accordance with the techniques described herein. As one example, username/password selection (210) can be performed prior to other portions of process 200 (and can be performed by an entity other than the end user of the messaging application, e.g., where an employer determines a username for an employee). As another example, the random server seed generation (204) and random local seed generation (206) can be performed prior to the keypair generation (202), e.g., with the local seed being used in conjunction with the generating of the keypairs. As yet another example, portions of processes 200 and/or 220 can be combined and/or omitted as applicable. For example, instead of generating a pool of fifty key pairs (224), assigning reference values to the pool as a batch operation (226) and storing the keys/values as a batch operation (228), fifty iterations of a process that generates a key pair, assigns a reference value, and stores the information can be performed.

Figure 2C:
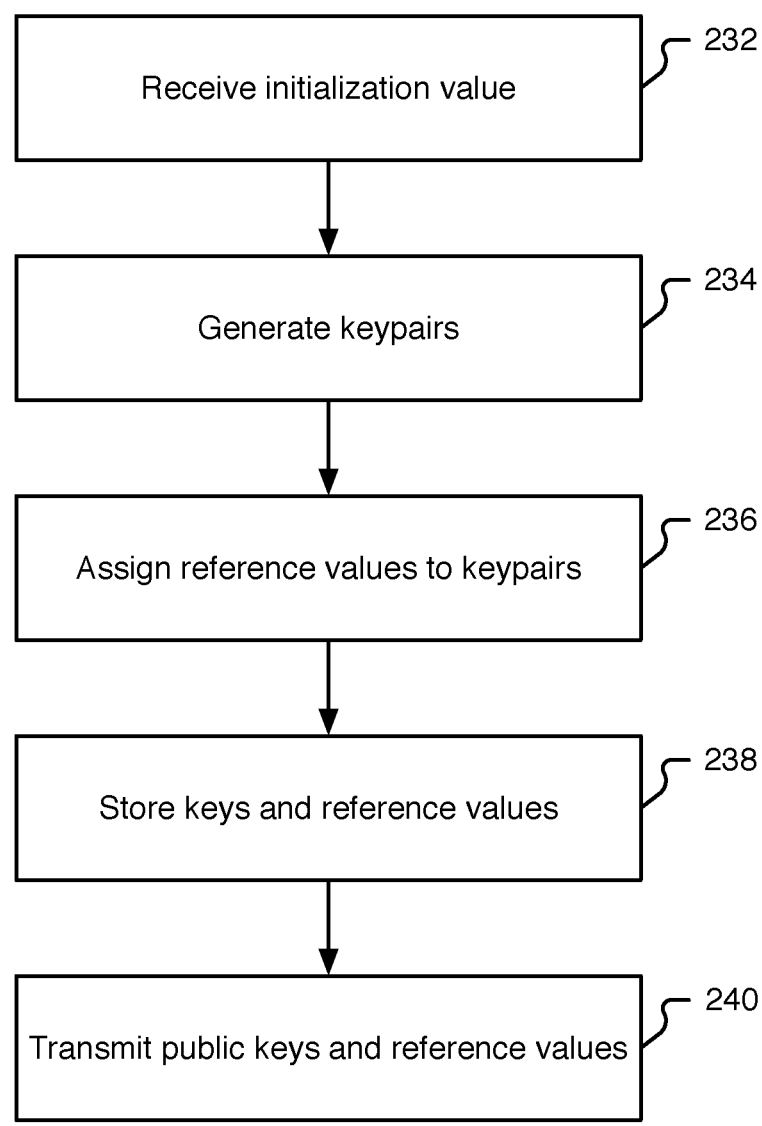

FIG. 2C illustrates an another example of the user registration process. In some embodiments, process 230 is performed by device 116. Process 230 can also be performed by other devices, including devices in environments other than those shown in FIG. 1. Process 230 begins at 232 when an initialization value is received. As one example, an initialization value of 50 (corresponding to a target minimum server key cache size of fifty public keys to be stored on platform 120) is received at 232. In some embodiments, in response to receiving a request from a device, such as device 116, platform 120 sets a server count (C)=0. The server count represents the number of public keys currently stored on platform 120 associated with the device. As device 116 is registering, no keys are present yet on platform 120.

In block 234, a number of keypairs may be generated. In this example, a number of asymmetric keypairs equal to the initialization value received at 232 (e.g., fifty) is generated. In some embodiments, the keypairs are randomly seeded.

In block 236, reference values that are used to uniquely identify each of the key pairs and described in more detail above are assigned for each of the keypairs generated at 234.

In block 238, the private key portion of the key pairs (i.e., the fifty private keys) and associated reference values are securely stored locally (e.g., on device 116). As one example, the private keys are inserted into a database resident on device 116 and secured using an AES key derived from the password selected by Alice at portion 210 in process 200.

Finally, in block 240, the public key portion of the key pairs (i.e., the fifty public keys) and associated reference values are securely transmitted to platform 120. As mentioned above, platform 120 will designate one of the fifty keys as a reserve key (e.g., by setting a flag associated with that particular key).

C. Sending DSB Secured Messages

Suppose Alice would like to send a message to Bob. She starts app 146 and is presented with an interface that includes a "compose" option. Alice selects the compose option and is presented with a message composition interface as shown in FIG. 3.

Figure 3:
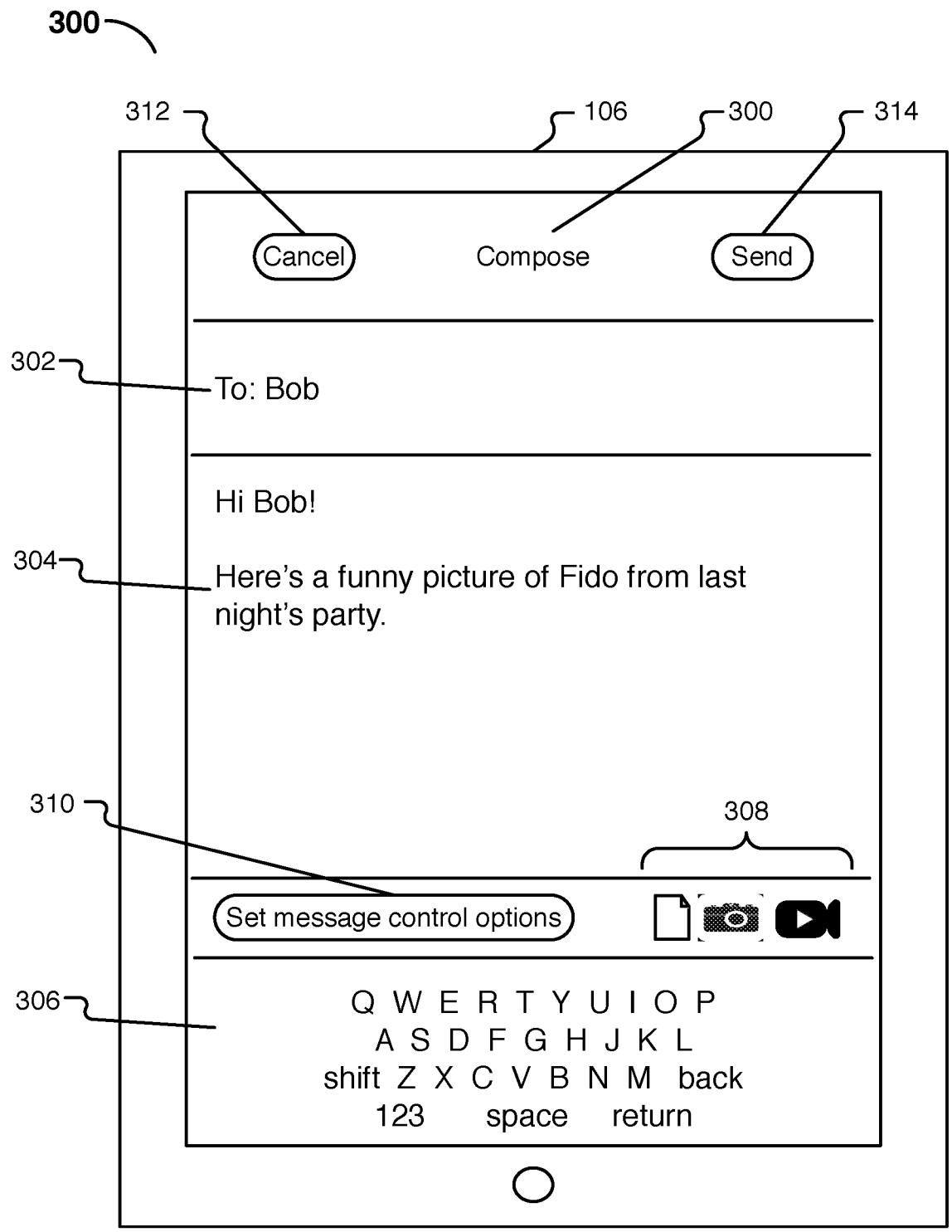
FIG. 3 illustrates an example of an interface.

In particular, FIG. 3 depicts interface 300 for composing a message. The interface 300 may include an on-screen keyboard in region 306. Accordingly, Alice can use the on-screen keyboard to enter the usernames of one or more recipients in region 302. One of ordinary skill in the art would recognize that apps for devices that include keyboards, such as certain mobile devices, laptops, desktops, etc., may omit the on-screen keyboard in lieu of a physical keyboard.

Next, any names that Alice enters into region 302 may be checked against Alice's privacy list, and the privacy lists of the recipients, to confirm that privacy settings allow Alice to send a message to the intended recipient(s). After entering the intended recipient(s), Alice may enter the text of the message in region 304 using a keyboard. Alice can optionally add attachments by interacting with buttons shown in region 308. For example, Alice may include documents, pictures, and audiovisual clips as an attachment to her message. By selecting button 310, Alice can specify various message control options, such as the lifetime/expiration of the message; on which device(s) the message and/or attachments can be unencrypted/read; and sharing, saving, forwarding, recalling, and deleting options of the message and/or the attachments.

If Alice is satisfied with her message, she can send it to Bob by clicking the send button 314. If she wishes to cancel out of composing the message, she can click the cancel button 312. Suppose Alice clicks send button 314 after composing the message shown in interface 300. An example of the events that occur, in some embodiments, in conjunction with Alice sending a message is illustrated as process 400 in FIG. 4 and will now be described.

Figure 4:
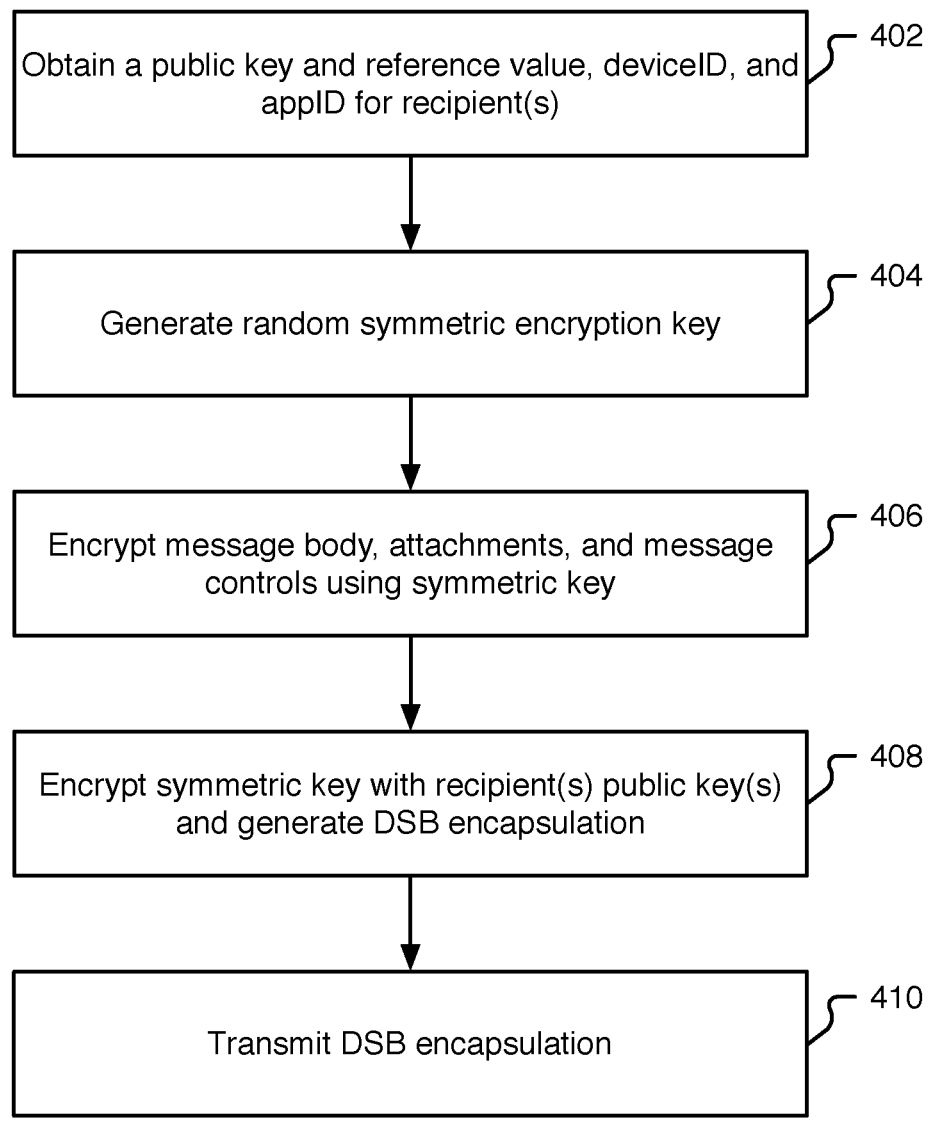
FIG. 4 illustrates an example of a message sending process.

FIG. 4 illustrates an example of a process for sending a DSB-secured message. In some embodiments, process 400 is performed on a client device, such as Alice's client device 116. The process begins at 402 when a particular public key (from the user's pool of public keys) and associated reference value, deviceID, and appID of a recipient are obtained from platform 120. As will be described in more detail below, in some embodiments, the recipient's public key is only obtained after platform 120 confirms that the sending of a message by the sender to the recipient is mutually permitted after checking one or more privacy lists. The recipient's particular public key, deviceID, and appID are used in the encryption of the symmetric key used to encrypt data, and in the DSB encapsulation of the message for the hardware/appID binding of the message. As one example, app 146 can request the information from platform 120 via an API (e.g., interface 122). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also wishes to send the message to other recipients, she can enter their names in region 302 as well, and one of their respective public keys (again selected from their respective pools of public keys) and associated reference values, deviceIDs, and appIDs will also be retrieved at 402 (after any applicable privacy checks have been performed).

In block 404, a random symmetric encryption key is generated (e.g., by app 146 on device 116). As one example, the symmetric key is an AES 256 bit key. In block 406, the symmetric encryption key is used to encrypt the message body, any attachments, and any message control options. In some embodiments, Alice's own information (e.g., public key(s) and associated reference value(s), deviceID(s), and appID(s) are included in the DSB as well. Finally, at 408, the symmetric key is encrypted with the particular public key of each recipient (obtained from the pool of public keys). A DSB encapsulation is then generated, and contains the aforementioned components and reference values of the public keys used to encrypt the symmetric key. Examples of the DSB format are provided below.

In some cases, a user may own multiple devices. For example, Bob may have mobile device 118 and a desktop computer, both of which are configured with secure messaging apps. Each of Bob's installations will have its own deviceID and appID. When the DSB is created, each of Bob's devices will be considered a separate device under the same username account.

The generated DSB is securely transmitted to platform 120 (e.g., by being encrypted with a symmetric key shared by the app and platform 120, and also encapsulated by TLS as an additional security layer). Irrespective of how many recipients Alice designates for her message (e.g., multiple recipients or multiple recipient devices), only one DSB will be created and transmitted to platform 120. Upon receipt of the DSB, processing engine 102, on behalf of the security platform 120, opens the DSB and determines the recipient(s) of the message. Specifically, the processing engine 102, on behalf of security platform 120, performs a match against the deviceIDs (e.g., in a cryptographic hash and camouflaged representation) included in the DSB and the deviceIDs stored in database 130, as well as the username (in a cryptographic hash and camouflaged representation) in the DSB and the ones stored in the database 130. Alternatively, security platform 120, using processing engine 102, may match the deviceIDs and usernames including in the DSB with those stored in user directory 106.

As used herein, a cryptographic hash and camouflaged representation means that the hash algorithm (i.e. SHA256) that is used for the deviceID, username, and appID values, is further camouflaged, in some embodiments, by taking multiple hashes of the result values (i.e. multiple rounds of SHA256 of the previous SHA256 value—i.e. SHA(SHA (SHA . . . ))). Processing engine 102 also creates an entry for the received DSB in message table 140 and notifies the recipient(s) that a new message is available. In various embodiments, other actions are also performed by platform 120 with respect to the DSB. As one example, platform 120 may be configured to remove the DSB as soon as the recipient successfully downloads it. As another example, platform 120 may enforce an expiration time (e.g., seven days) by which, if the DSB has not been accessed by the recipient, the DSB is deleted. Where multiple recipients are included in a DSB, platform 120 can be configured to keep track of which recipients have downloaded a copy of the DSB, and remove it once all recipients have successfully downloaded it (or an expiration event has occurred).

D. DSB Examples

Figure 5:
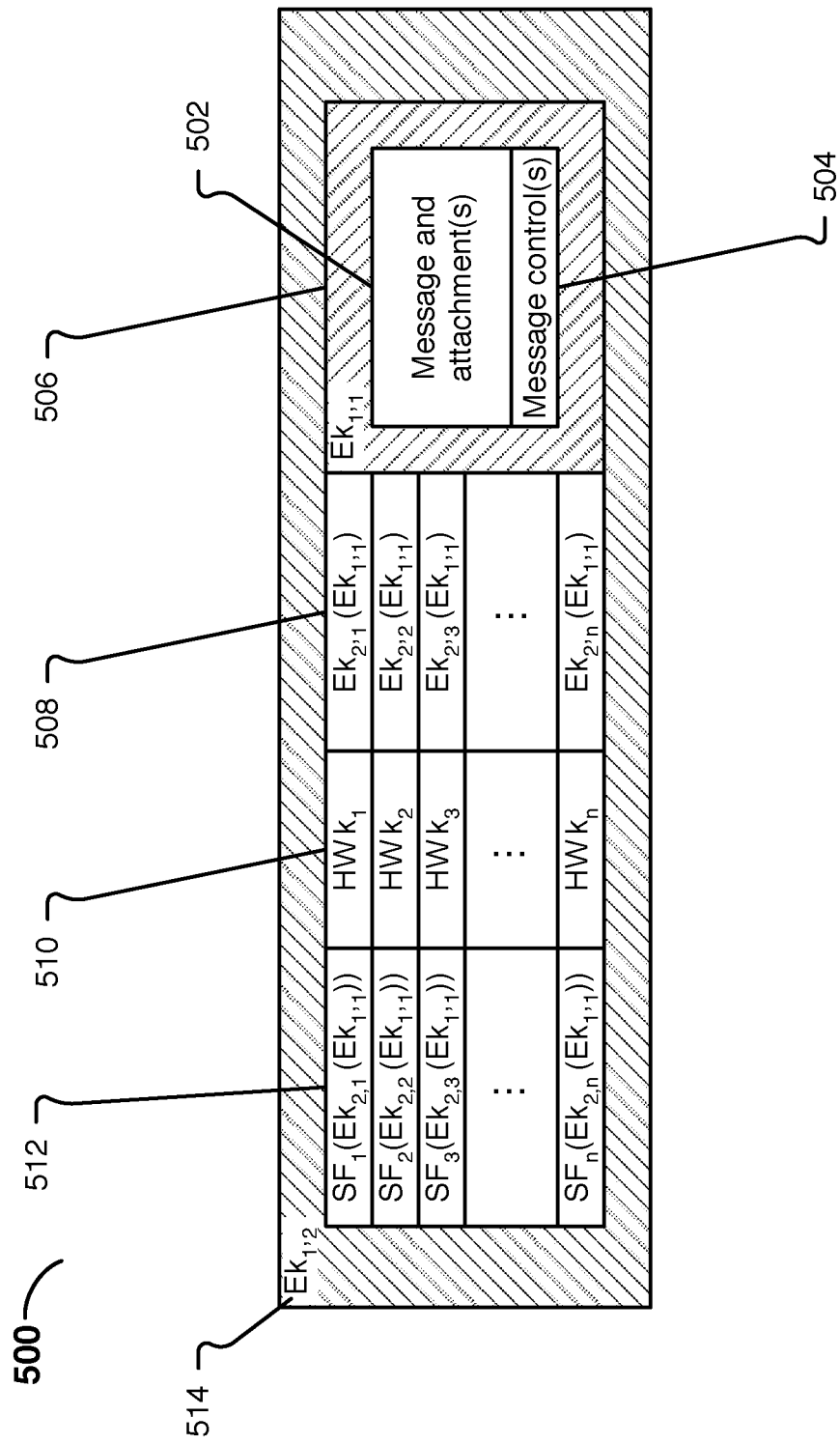
FIG. 5 illustrates an example of a digital security bubble.

FIG. 5 illustrates an example of a digital security bubble (DSB). DSB 500 is an example of output that can be generated by app 146 as a result of executing process 400. In the example shown, DSB 500 includes a message and optional attachments 502, and one or more message controls 504 encrypted with a key $Ek_{1,1}$ (e.g., encrypted portion 506).

In some embodiments, key $Ek_{1,1}$ is generated by app 146 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-n, the key $Ek_{1,1}$ encrypted by each of the recipient's respective particular public keys (as shown in region 508). Further, DSB 500 includes a combination of each recipient's respective deviceID, hashed username, appID, and the reference value associated with the particular public key (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 120.

Figure 8:
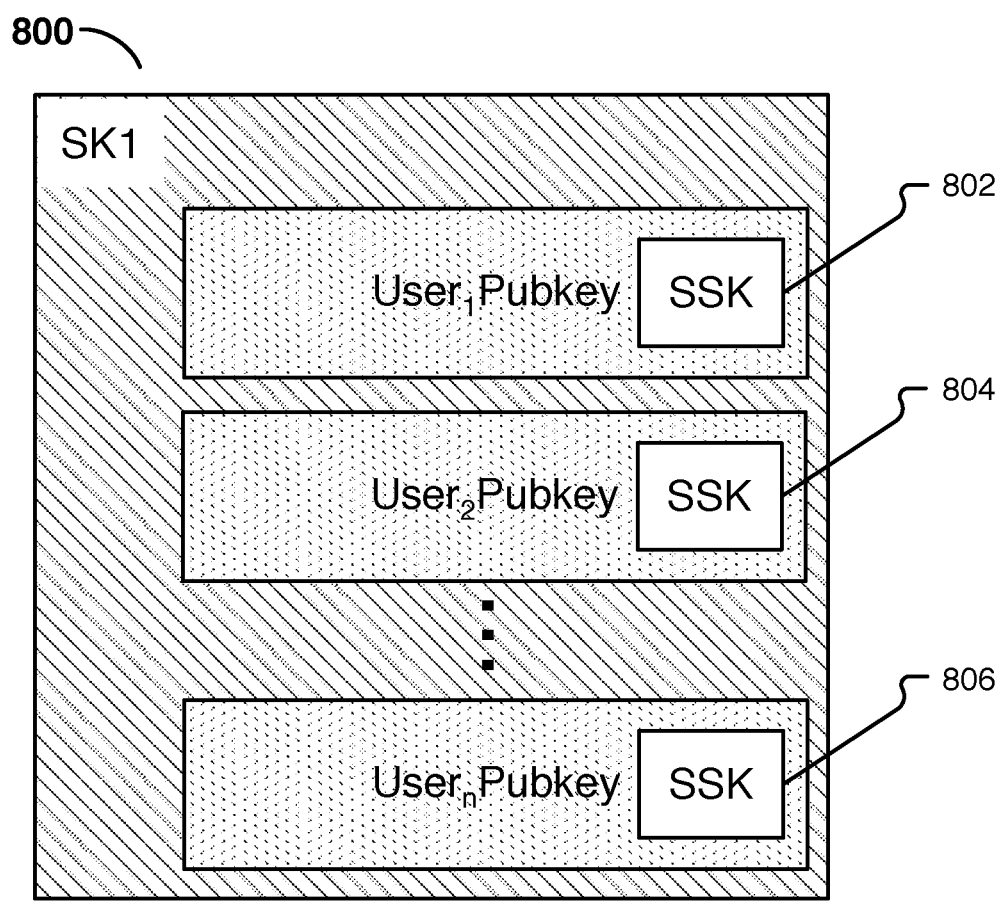
FIG. 8 illustrates an example of a portion of a digital security bubble.

In some embodiments (e.g., as is shown in FIG. 5), a spreading function may be used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each recipient. Finally, the DSB itself may be encrypted using key $Ek_{1,2}$ (encrypted portion 514), which is a symmetric key shared between app 146 and platform 120. Additional detail regarding portions 514 and 508 are shown in FIG. 8, where SK1 in FIG. 8 is $Ek_{1,2}$ in FIG. 5 and represents the symmetric encryption key shared by the app 146 and platform 120, and where $User_1Pubkey$ in FIG. 8 is $Ek_{2,1}$ in FIG. 5 and represents the recipient's particular public key. For example, the recipient's particular public key may be selected from the pool of public keys generated at block 202 in FIG. 2A.

Figure 6:
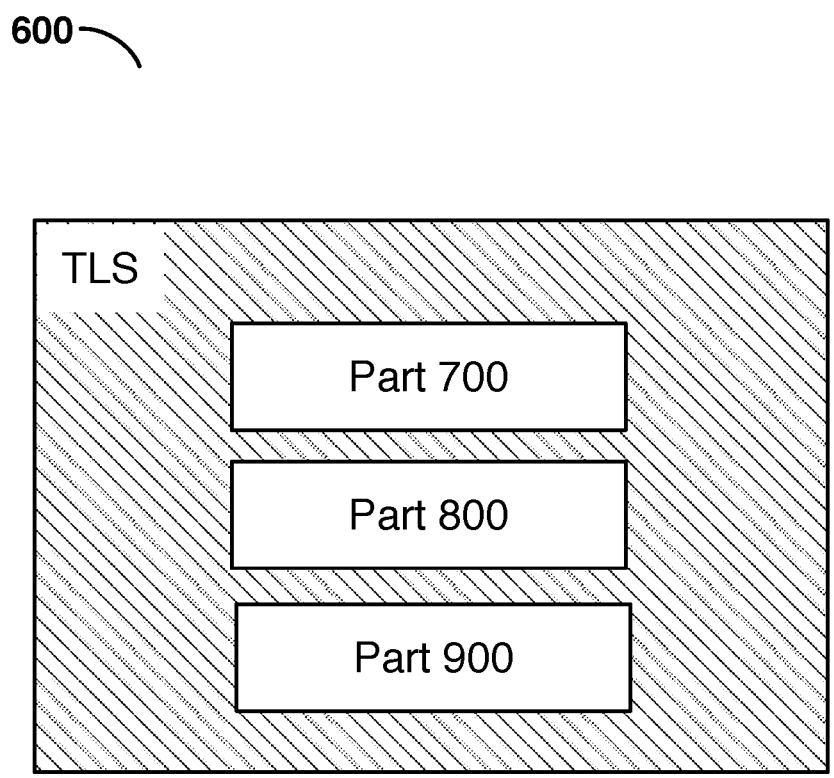
FIG. 6 illustrates an example of a digital security bubble.
Figure 7:
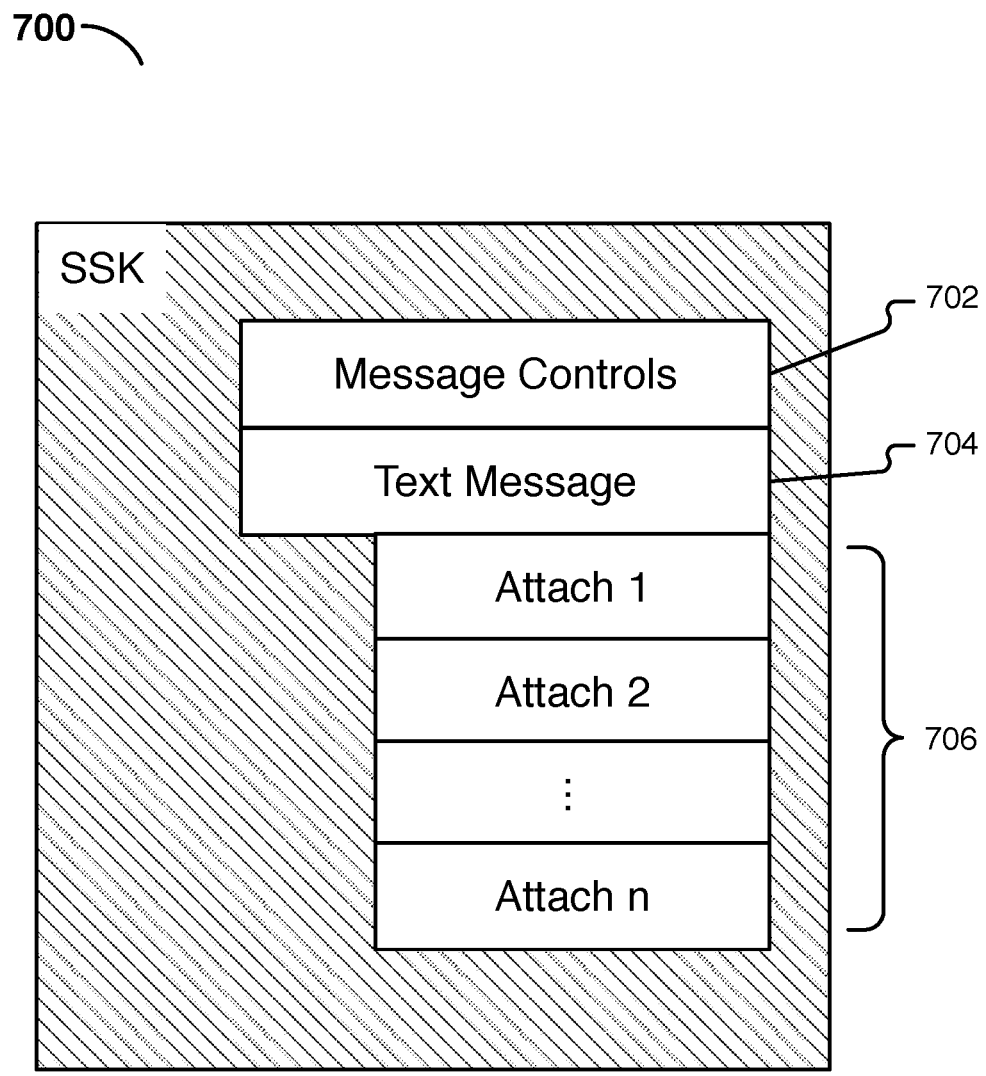
FIG. 7 illustrates an example of a portion of a digital security bubble.
Figure 9:
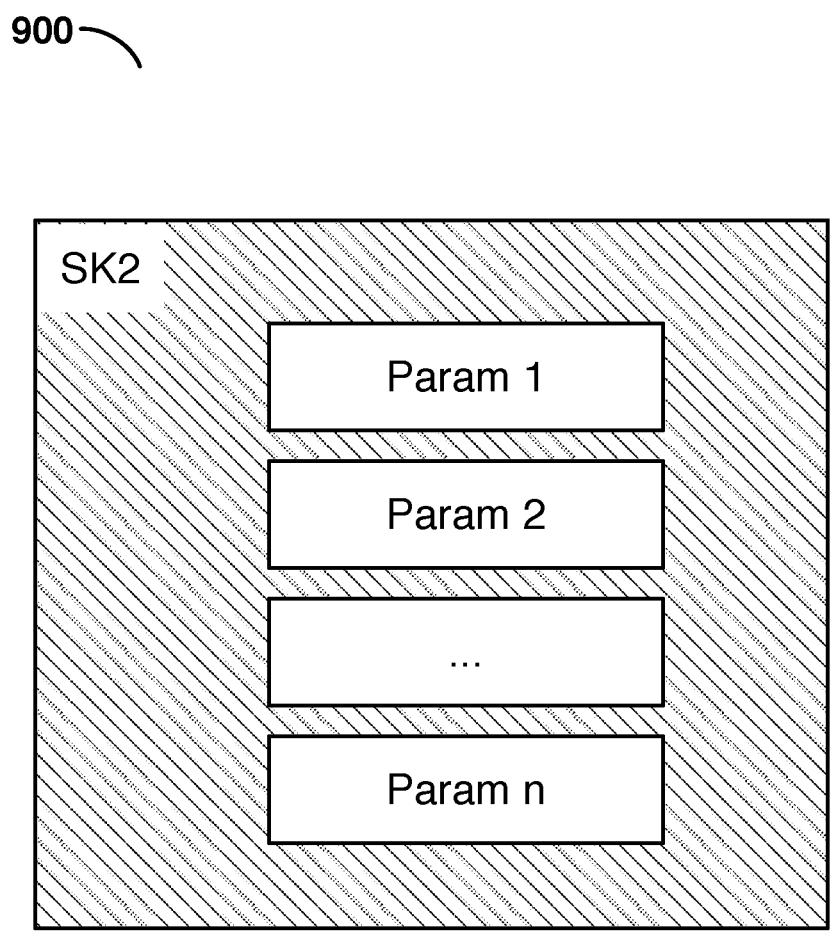
FIG. 9 illustrates an example of a portion of a digital security bubble.

FIGS. 6-9 illustrate additional examples of the construction of an embodiment of a DSB. FIG. 6 illustrates an example of a DSB 600 THAT encapsulates three subcomponents—part 700 (the encrypted message, attachments, and message controls), part 800 (the symmetric key encrypted with each recipient's particular public key selected from the recipients' respective key pools), and part 900 (encrypted message parameters). As with DSB 500, a symmetric key (shared by app 146 and platform 120) is used to secure the DSB. In addition, the transmission of the DSB to the server may be encapsulated with TLS for an additional security layer. FIG. 7 illustrates part 700 of DSB 600. In particular, part 700 includes the message controls 702, message 704, and attachments 706. Part 700 is encrypted using a shared symmetric key SSK (e.g., $Ek_{1,1}$). FIG. 8 illustrates part 800 of DSB 600. In particular, part 800 includes the shared symmetric key, encrypted to each of the recipients' respective particular public keys (selected from the recipients' respective key pools). Further, the collection of encrypted keys (e.g., 802-806) is encrypted using symmetric key SK1. FIG. 9 illustrates part 900 of DSB 600. In particular, part 900 includes encrypted message parameters. Part 900 is encrypted using symmetric key SK2.

E. Compliance Review

Some enterprise environments, especially those in the financial sector, are required to maintain memoranda, correspondence, communications, and other documents and records for audit purpose. Accordingly, security platform 120 may provide additional functionality that enables companies to automatically review and retain messages communicated via security platform 120.

Figure 10:
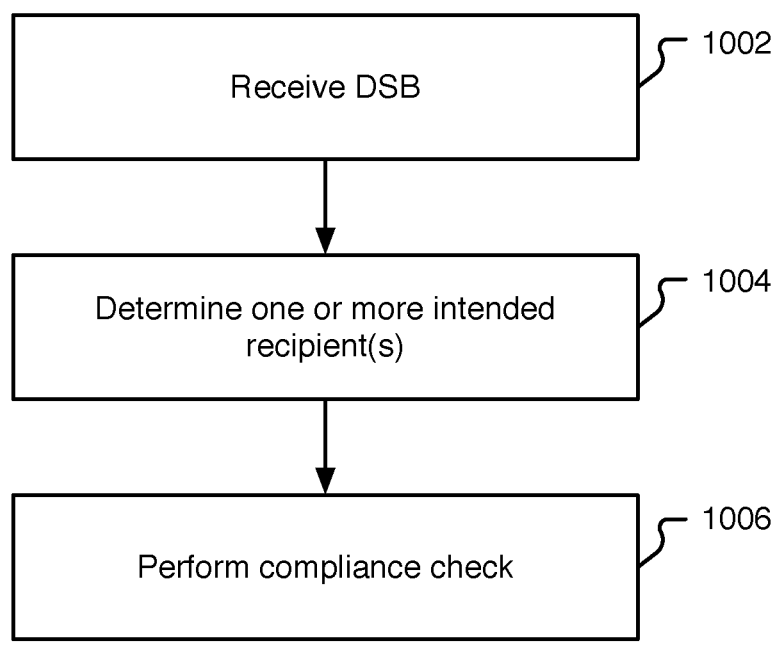
FIG. 10 illustrates an example of a process for a security platform handling a digital security bubble.

FIG. 10 illustrates an example of the security platform receiving a DSB from a sender and submitting the received DSB to a compliance engine. As noted above, the generated DSB may be securely transmitted to platform 120. In block 1002, security platform 120 may receive a DSB from a sender. As discussed above, Alice may transmit the DSB to security platform using TLS to provide an additional layer of security.

In block 1004, the security platform 120, using processing engine 102, may open the DSB to determine the intended recipient(s) of the message. According to some embodiments, determining the intended recipient(s) may include decrypting the plurality of parameters, such as the hashed username, deviceID, and appID, using the symmetric key (SK2) that Alice shares with platform 120.

Processing engine 102, on behalf of the security platform 120, may match the deviceID(s) and the username(s) included in the DSB with the deviceID(s) and username(s) stored in database 130 to determine the intended recipient(s). Alternatively, security platform 120, using processing engine 102, may match the deviceIDs and usernames included in the DSB with those stored in user directory 106.

In block 1006, a compliance check is performed on the received DSB. In this regard, the compliance engine 124 may review the DSB to ensure that the DSB complies with federal and state laws and regulations, as well as the company's internal policies. Alternatively, the compliance engine 124 may interface with the company's already existing compliance engine (e.g., compliance engine 152) to ensure that the communication satisfies both internal company policies, as well as federal and state laws and regulations. Additional details of the compliance check are provided below.

Figure 11:
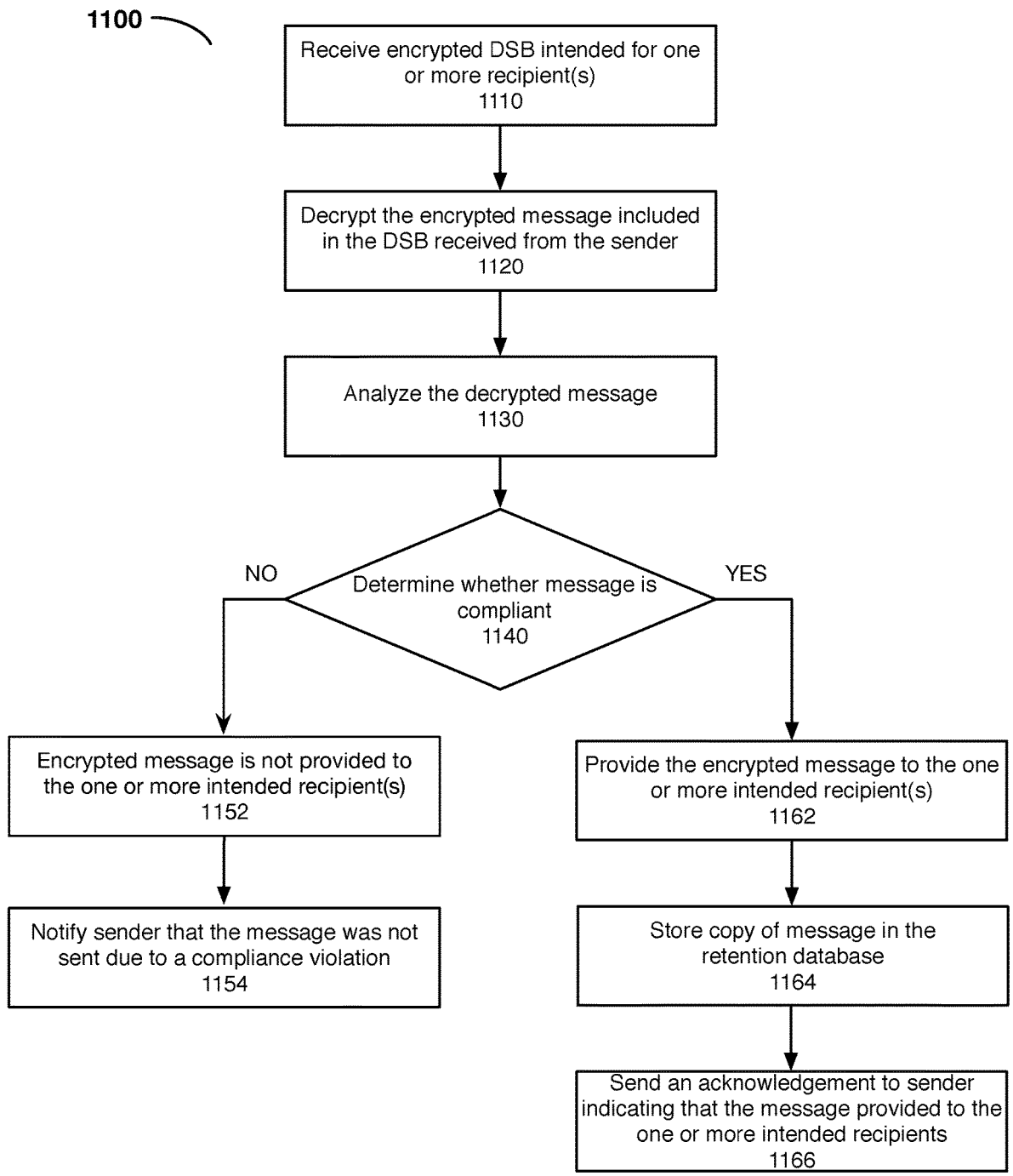
FIG. 11 illustrates an example of a process for performing a compliance verification of a received digital security bubble.

FIG. 11 provides an example of a process for determining whether the received DSB is compliant with statutes and regulations, as well as company policies. Process 1100 begins in block 1110 in which a compliance engine receives an encrypted DSB intended for one or more recipient(s).

In block 1120, the compliance engine decrypts the encrypted message included in the DSB received from the server. As discussed above, the security platform 120 may not have access to encrypted messages. However, in the enterprise environment, security platform 120, compliance engine 124, compliance engine 152, or another enterprise or communication entity (collectively "enterprise party") may be carbon copied (CC'd) or blind-carbon copied (BCC'd) on all communications in and out of the enterprise environment in order for messages to be submitted for compliance review. Since an enterprise party may be included as an intended recipient, the enterprise party will be able to decrypt the encrypted message in the same manner as any other intended recipient.

In block 1130, the decrypted message is analyzed by the compliance engine. In this regard, the analysis performed by the compliance engine may include reviewing the intended recipients or the content of the actual message. That is, the compliance engine may review the message to ensure that sensitive and/or critical information is not transmitted outside the corporate network. Sensitive and/or critical information may include private or company information, intellectual property (IP), financial or patient information, credit-card data, and other information depending on the business and the industry.

In block 1140, a determination is made whether the message is compliant. For example, the compliance engine may verify that the message adheres to state and/or federal laws and regulations, company policies, or any combination thereof.

If the message is not compliant, the process proceeds to block 1152 where the DSB, including the encrypted message, is not provided to the one or more intended recipient(s). That is, the security platform 120 may block the DSB from being delivered to one or more recipients. Accordingly, the compliance engine may notify that the sender that the message was not compliant in block 1154. In this regard, the message may be returned to the sender so the sender can revise the message. Alternatively, the compliance engine may forensically delete the non-compliant message.

If the message is compliant, the DSB is provided to the one or more intended recipient(s) in block 1162 as described in greater detail below.

In block 1164, the message sent to the enterprise party may be stored in retention database. According to one example, the time-to-live option for the enterprise party may be set separately than the time-to-live for other intended recipient(s). That is, the time-to-live for messages sent to the enterprise party may be set to comply with company policies, as well as federal and state laws and regulations, while messages sent to other recipients may be set with a different time-to-live option. Accordingly, the compliance engine may store messages sent to the enterprise party in the retention database as mandated by law and company policy. After expiration of the time-to-live, the messages stored in the retention database may forensically deleted.

The process 1100 concludes in block 1166, where the compliance engine may provide an acknowledgement to the sender indicating that the DSB has been delivered to the one or more intended recipient(s).

Figure 12:
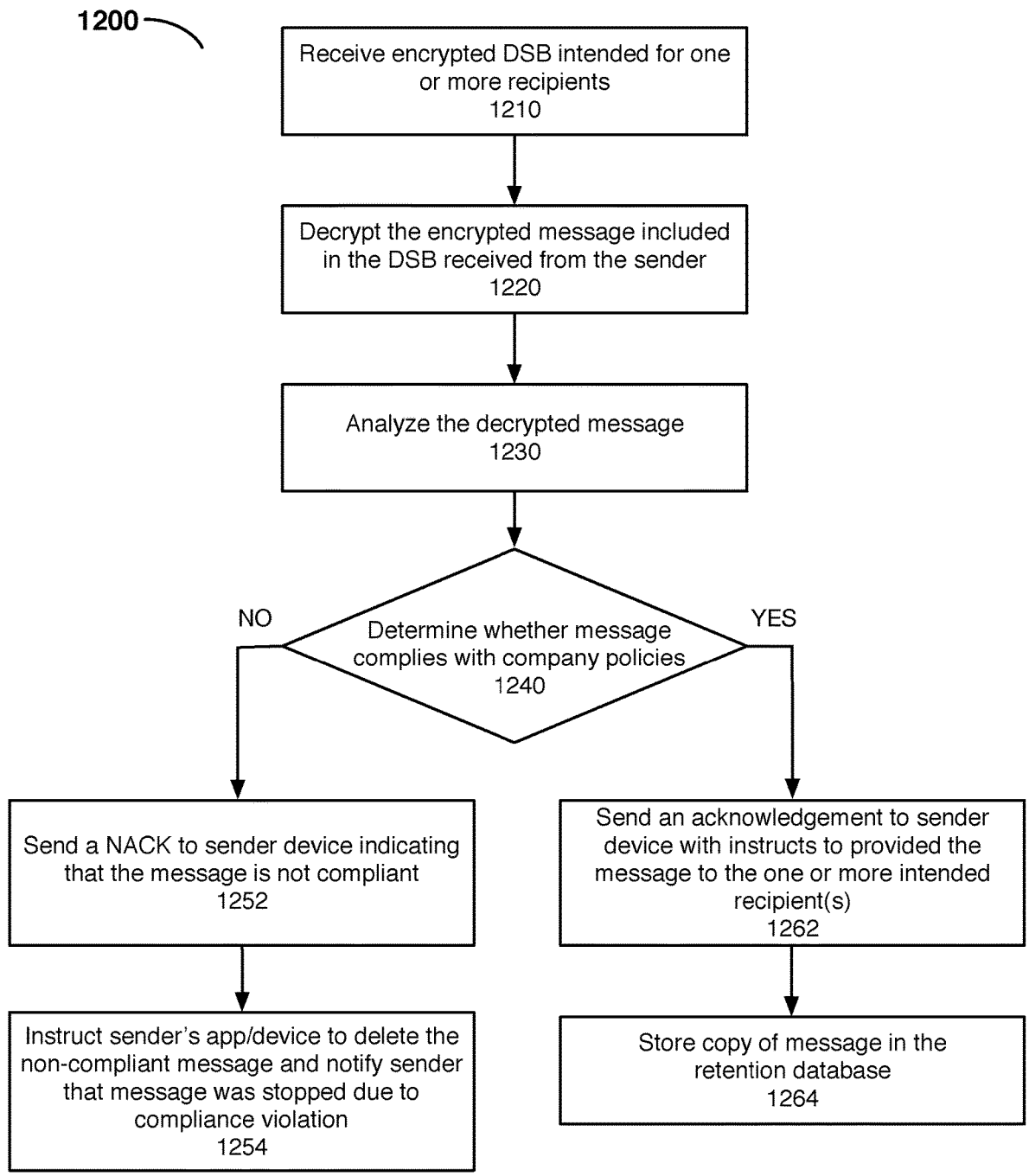
FIG. 12 illustrates an example of a process for performing a compliance verification of a received digital security bubble.

FIG. 12 provides another example of process 1200 for determining whether a message is compliant. Similar to FIG. 11 above, process 1200 begins in block 1210 in which a compliance engine receives an encrypted DSB intended for one or more recipient(s).

In block 1220, the compliance engine decrypts the encrypted message included in the DSB received from the server as discussed above. In block 1230, the decrypted message is analyzed by the compliance engine as described above with respect to FIG. 11. The compliance engine makes a determination as to whether the message is compliant in block 1240.

If the message is not compliant, the process proceeds to block 1252 where the compliance engine sends a negative-acknowledgement (NACK), or an equivalent message or indication, that notifies the sender's device that the message is non-compliant. In block 1254, the compliance engine may provide instructions to the app or the device to delete the non-compliant message and notify the sender that the message was stopped due to a compliance violation. In response to receiving the instructions from the compliance engine, the app may forensically delete the message such that it is unrecoverable.

If the message is determined to be compliant in block 1240, the process sends an acknowledgement to the sender device with instructions to provide the DSB to the one or more intended recipient(s) in block 1262. For example, the security platform 120 may provide an authorization code which the app on the client's device uses to transmit the message. In block 1264, the compliance engine may provide a copy of the message to the retention database.

The order of the steps described above may be altered or removed within the scope of the invention. For example, instructions provided to the sender device from the compliance engine may be sent simultaneously. In another example, notification that the message was non-compliant may not be provided to the sender. Instead, the sender may merely be notified that the message was not delivered. One of ordinary skill in the art would understand the various iterations and permutations that could be performed with respect to the compliance determinations discussed above.

F. Receiving DSB Secured Messages

As mentioned above, Bob is also a user of platform 120. When Bob loads his copy of the messaging app on his smartphone (i.e., app 148 on device 118), the app communicates with platform 120 (e.g., via interface 122) to determine whether Bob has any new messages. As will be described in more detail below, platform 120 may also determine how many additional keypairs Bob's device should generate to replenish his pool, and facilitate the generation of those keypairs. Since Alice has sent a message to Bob since he last used app 148, a flag is set in database 130, indicating to app 148 that one or messages are available for download.

Figure 13:
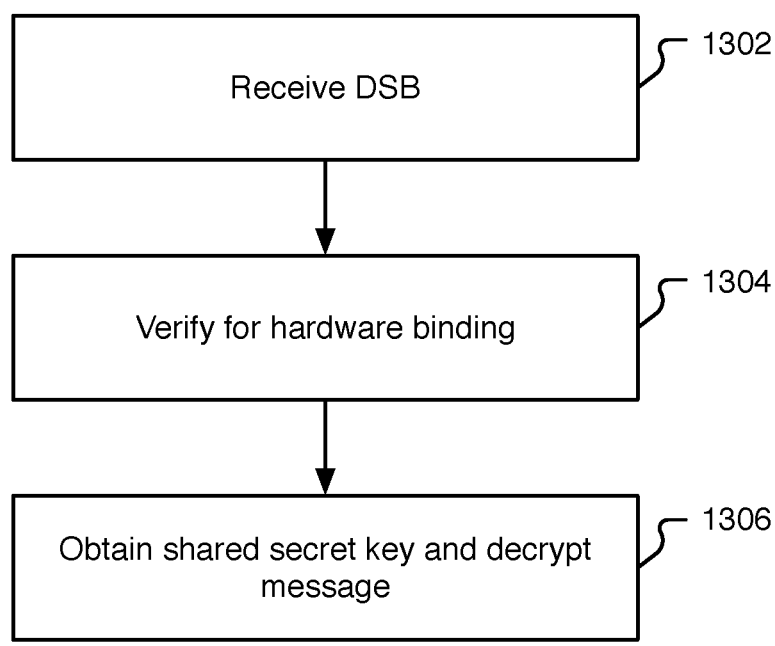
FIG. 13 illustrates an example of a process for receiving a message.

FIG. 13 illustrates an example of a process for accessing a message included inside a digital security bubble. In some embodiments, process 1300 may be performed on a client device, such as Bob's client device 118. The process begins at block 1302 when a DSB is received. As one example, a DSB is received at 1302 when app 148 contacts platform 120 and determines a flag associated with Bob's account has been set (e.g., indicating he has one or more new messages). Bob may then download the one or more DSBs from platform 120. In such circumstances, upon receipt of the DSB, client 118 is configured to decrypt the DSB using Bob's particular private key that corresponds to the public key that was selected from his pool at message creation time, which is identifiable by the reference value included in the DSB.

If decryption was successful, process 1300 proceeds to block 1304 wherein the hardware binding parameters included in the DSB are verified. For instance, a determination may be made as to whether the recipient's device information can be used to construct an identical hash to one of the deviceIDs included in the received DSB. If the hardware binding parameters fail the verification, (i.e., an attempt is being made to access Alice's message using Bob's keys on a device that is not Bob's), decryption of Alice's message will be prevented and the contents of the DSB will be inaccessible, preventing the decryption of Alice's message.

However, if the hardware binding parameter verification is successful, the device may be authorized to decrypt the symmetric key (i.e., using Bob's private key generated at 202), which can in turn be used to decrypt Alice's message in block 1306. As will be described in more detail below, additional controls can be applied (e.g., by Bob's app 148) to restrict Bob's ability to access Alice's message.

G. Secure Time-to-Live (TTL)

As mentioned above, one example of a message control may be a limit on the time period during which a recipient is able to access the message. As used herein, this time limit may be referred to as a "time-to-live" or "TTL." More information regarding the Secure TTL described herein may be found in U.S. Ser. No. 14/314,018, entitled "Secure Time-to-Live," the entirety of which is incorporated by reference herein in its entirety.

In embodiments where the sender is using an embodiment of platform 120 operated by an enterprise on behalf of its employees, the TTL may be selected by an entity other than the sender. For example, the TTL value may be based on a default corporate policy or based on administrator configurable rules implemented by an enterprise-specific version of the secure messaging application. In this regard, messages sent between employees may have a first default TTL, while messages sent by employees to vendors may have a second default TTL. Additionally, messages sent by specific employees (e.g., within a particular department such as the legal department, or having certain titles or positions, and, e.g., as specified on a privacy list) may be given different default TTLs. In various embodiments, the default TTL can be overridden, if permitted by an administrator configuration.

Further, a different TTL value may be set for different recipients. As discussed above, messages between employees may have a first default TTL. However, in the enterprise environment, where an enterprise entity may receive a copy of each message transmitted, messages sent to the enterprise party may have a different TTL value. As noted above, this TTL value may be set based on the sender's role or the context of the message.

The TTL may be encrypted and sent with the secure message. When the recipient opens the message, the message and corresponding TTL value may be decrypted and displayed on the recipient's device. According to some embodiments, the TTL may be converted into a message expiry time by adding the TTL (e.g., expressed in seconds) to the current time. In other embodiments, the TTL may be stored in the recipient's device's secure database and encrypted to prevent the recipient, or other user of the recipient's device, from tampering with the secure TTL. As will be described in more detail below, the current time can also be secured (e.g., against attempts by the recipient to thwart the TTL by adjusting a clock on the recipient's device). Once the TTL has expired, the message may no longer be accessible to the recipient. For example, the message may be made inaccessible from the recipient's viewing interface. Alternatively, or additionally, the message may be deleted from the recipient's device's secure database, along with any associated decryption keys.

The sender may specify time limits in a variety of ways. Alternatively, the sender's application, for example—as configured by an enterprise administrator, may specify the time limits for messages. In this regard, the sender may set a maximum duration (e.g., a one day limit), with the time limit countdown commencing when the recipient first opens the message. The time limit countdown can also be commenced when the sender sends the message. As another example, the sender can specify a fixed start time (e.g., for embargo purposes) before which the recipient is unable to access the message, even if the recipient is already in possession of the message. That is, the recipient may not be able to open the message until a time specified by the sender. Once the embargo period ends, a TTL value may control how long the recipient is able to view the message. This may allow for a company to release company news to multiple shareholders in a secure, time-controlled manner, with each shareholder having the same opportunity to open the message at the same start time. This also allows an enterprise to implement rules (e.g., via an enterprise-specific version of the secure messaging application/platform 120) that only allows employees to open messages during certain periods of the day. For example, hourly workers can only read messages during business hours, while salaried workers might not have such a prohibition.) As yet another example, the sender can specify a fixed end time after which the recipient is unable to access the message (irrespective of whether the message was also given an "upon opening"

TTL, e.g., of ten minutes). Further, in various embodiments, a sender of the message can shorten a limit on an already sent message. For example, if Bob sends Alice a message with a one day limit, and Alice opens that message, Bob may subsequently revoke Alice's ability to continue reading the message (even though the day has not passed) by interacting with his app. For example, Bob may click on the sent message and select an "expire now" (immediately expiring the message) or "expire faster" (expiring the message at a new time picked by Bob).

Figure 14:
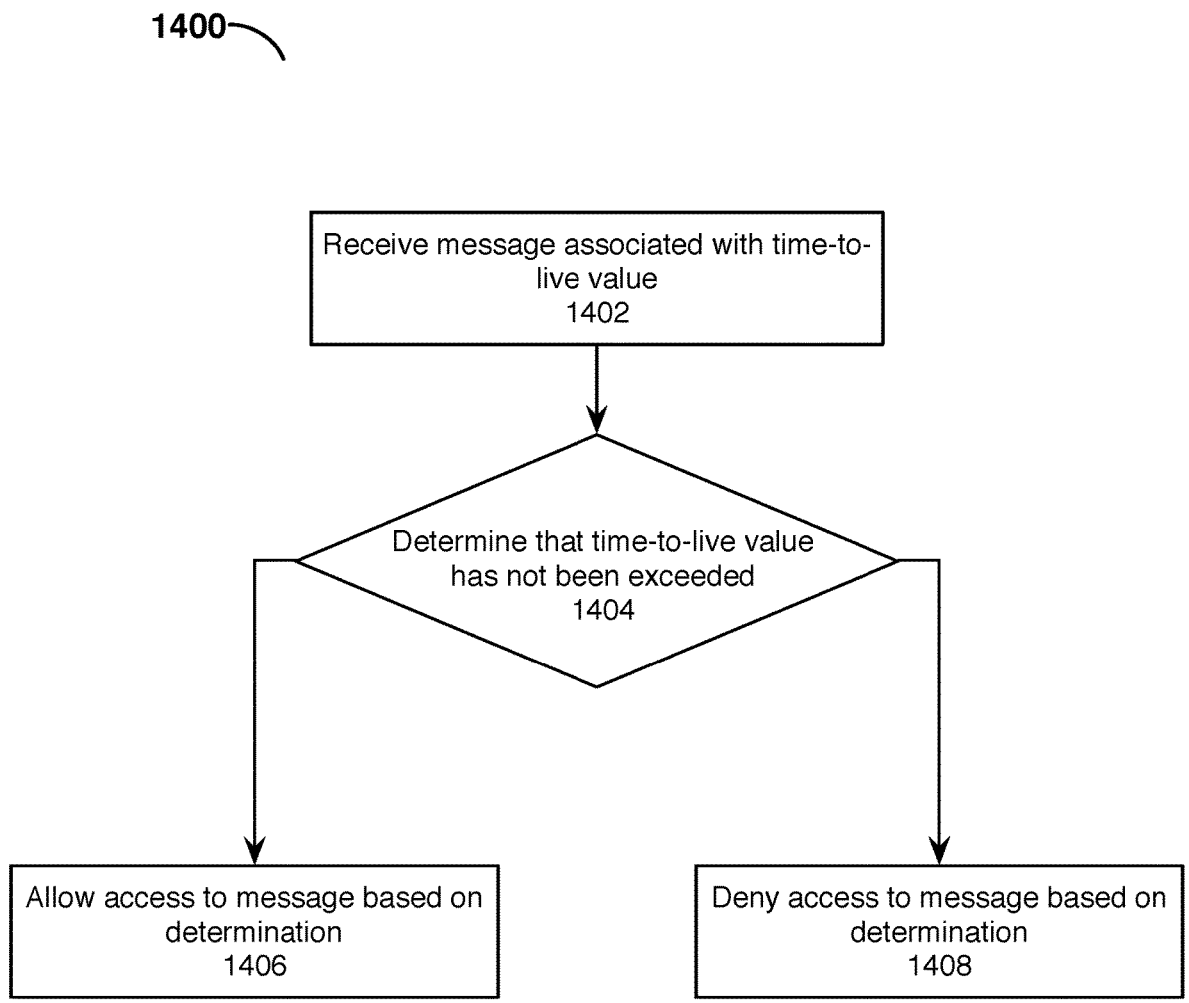
FIG. 14 illustrates an example of a process for determining whether to allow access to a message.

FIG. 14 illustrates an example of a process for determining whether to allow access to a message. In various embodiments, process 1400 is performed on a client device, such as Alice's client device 116. The process begins at block 1402 when a message that includes an associated TTL value is received. As noted above, the TTL value may be stored in the recipient's device's secure database in order to prevent tampering of the TTL value by the recipient. Next, a determination is made as to whether the TTL has been exceeded in block 1404. If the TTL has not been exceeded, the message is made available to the recipient in block 1406. As one example, when the recipient initially opens the message, the associated TTL may be decrypted and read by the app such that the app may begin counting down. So long as the TTL has not been exceeded (e.g., 3601 seconds have elapsed since the message was opened), the recipient may continue to view the message. Once the TTL has been exceeded, the recipient will be denied access to the message in block 1408 and the message will be removed from the recipient's device.

Figure 15:
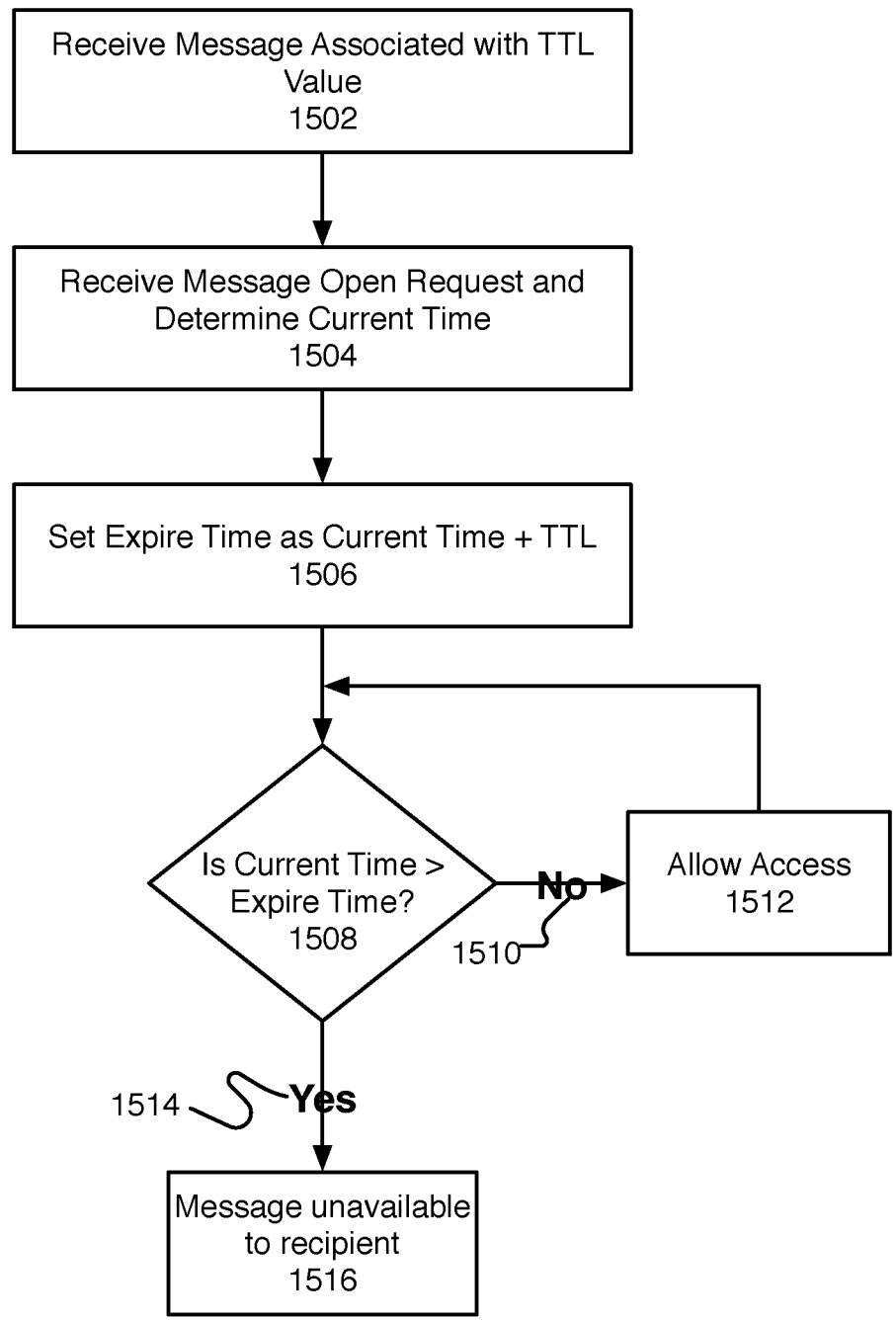
FIG. 15 illustrates an example of a process for determining whether to allow access to a message.

FIG. 15 illustrates an example of a process for determining whether to allow access to a message. Process 1500 is an embodiment of process 1400 and may be performed on a client device, such as Alice's client device 116. The process begins at 1502 when (as with 1402) a message that has an associated TTL value is received. At 1504, a message open request may be received. In response to the message open request, a Current Time may be determined. One approach for determining a Current Time is to use the device time. However, a nefarious device user could attempt to circumvent TTL enforcement by modifying the device date, time, and/or time zone settings. Accordingly, a second approach for determining a Current Time is for the recipient's secure messaging app to contact platform 120 (or another external time source, such as a dedicated time server) and obtain a Current Time from platform 120 (or the other external time source). In some embodiments, if an app is unable to obtain a Current Time, the recipient may be unable to open the message until a Current Time may be obtained.

In block 1506, the message expiration time ("Expire Time") is set as the Current Time (determined at 1504) plus the TTL (e.g., 3600 seconds). At block 1508, a determination is made as to whether the Current Time is greater than the Expire Time. If not (1510), Alice is able to view the message in block 1512. After a period of time, the process returns to block 1508 and another comparison of the Current Time and the Expire Time is performed. In various embodiments, the Current Time continues to be obtained from an external source. For example, device 116 may contact platform 120 after a predetermined period, such as once a second, once every 30 seconds, etc. In other embodiments, the app located on the recipient's device may be responsible for maintaining the Current Time, at least a portion of the time, after performing an initial check with platform 120 of the Current Time when the message was first opened. In some embodiments, if a Current Time cannot be obtained from an external source (e.g., platform 120 or another server) during the ongoing checking of portion 1508, the message may cease being available to the recipient. For instance, if the recipient temporarily loses connectivity during the one hour window of time the sender has allowed to read the message, the recipient will be unable to read the message during that portion of the hour that connectivity was lost. In some embodiments, the TTL countdown may continue, irrespective of whether the recipient is offline, meaning that the recipient will not be given additional time to view the message to compensate for the period her device lacked connectivity. Eventually (e.g., after one hour has elapsed), the Current Time will exceed the Expire Time (1514), at which point the message may be made unavailable, for example—due to deletion, to the recipient in block 1516.

Figure 16:
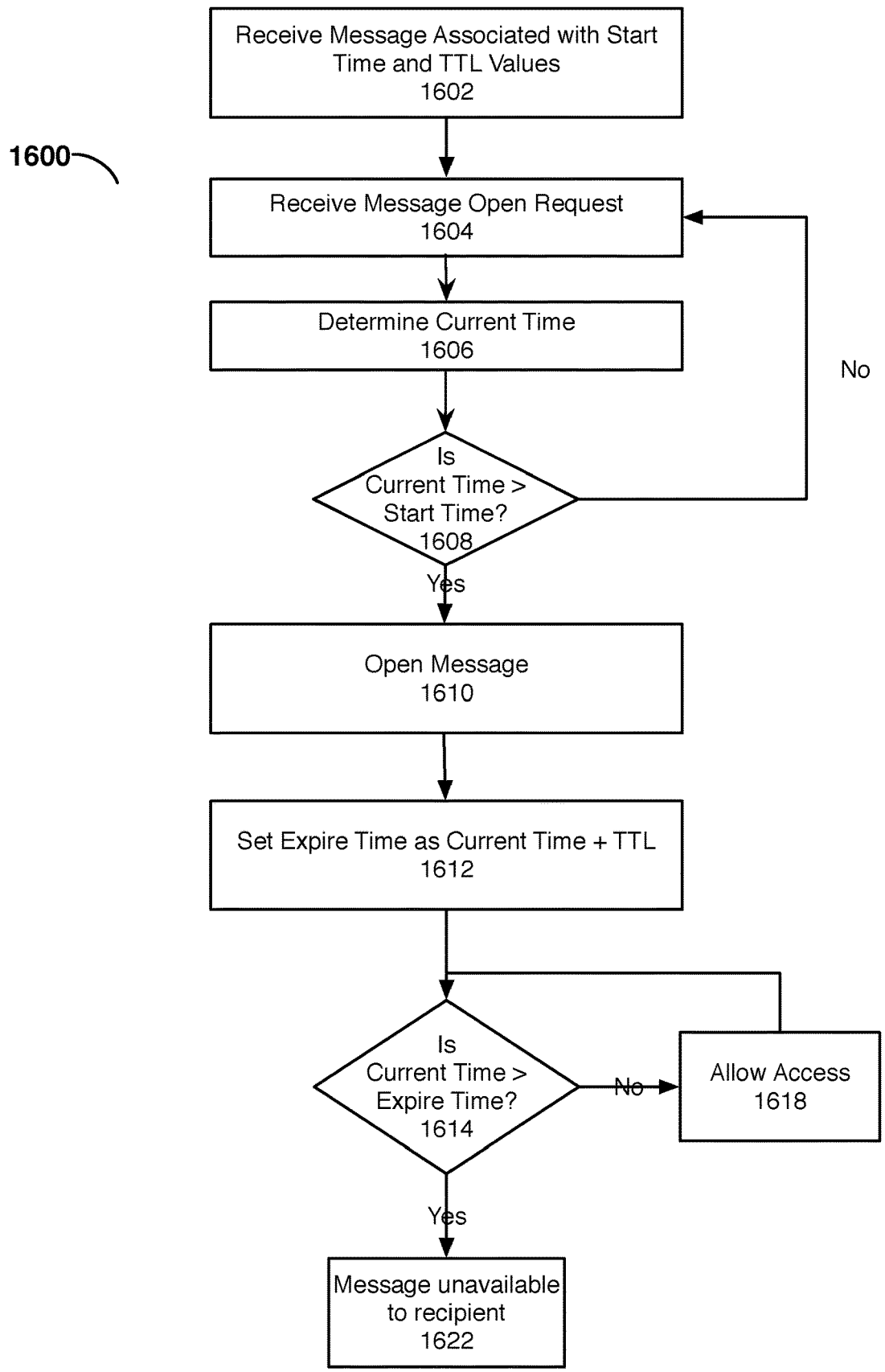
FIG. 16 illustrates an example of a process for determining whether to allow access to a message.

FIG. 16 illustrates another example of a process for determining whether to allow access to a message based on a received TTL value. Process 1600 is an embodiment of process 1400 and may be performed on a client device such as Alice's client device 116 in some embodiments. The process begins at block 1602 when a message that has multiple TTL-related values is received. As one example, a start time (i.e., embargo time) may be provided, as well as a duration time (e.g., 3600 seconds, as per above). Process 1600 can also be adapted to accommodate a hard end time (instead of, or in addition to a start time), as applicable.

In block 1604, the recipient's app may receive a Message Open Request. In response to the Message Open Request, the recipient's device may obtain the Current Time in block 1606 via the techniques described above. In block 1608, a determination may be made whether the Current Time exceeds the Start Time. If the Current Time does not exceed the Start Time in block 1608, the Message Open Request will be ignored since the end of the embargo has not yet been reached. In this regard, the process returns to block 1604 and periodic comparisons of the Current Time and the Start Time may be performed until the embargo ends.

If the Current Time exceeds the Start Time, then the message is opened in block 1610. The remainder of process 1600 continues as per process 1500. That is, the Current Time may be determined so the Expire Time may be set as the Current Time and TTL in block 1612. The Current Time may be periodically compared to the Expire Time in block 1614 to determine whether to continue to allow access to the message. If the Current Time does not exceed the Expire Time, then the recipient is allowed to access the message in block 1618. However, if the Current Time exceeds the Expire Time, the message may be made unavailable to the recipient in block 1622.

H. Responding and Key Synchronization

The following are examples of processes that can be performed by various entities present in the enterprise environment depicted in FIG. 1. The processes can also be performed outside of enterprise environment illustrated in FIG. 1, such as by other types of platforms and/or devices.

Figure 17:
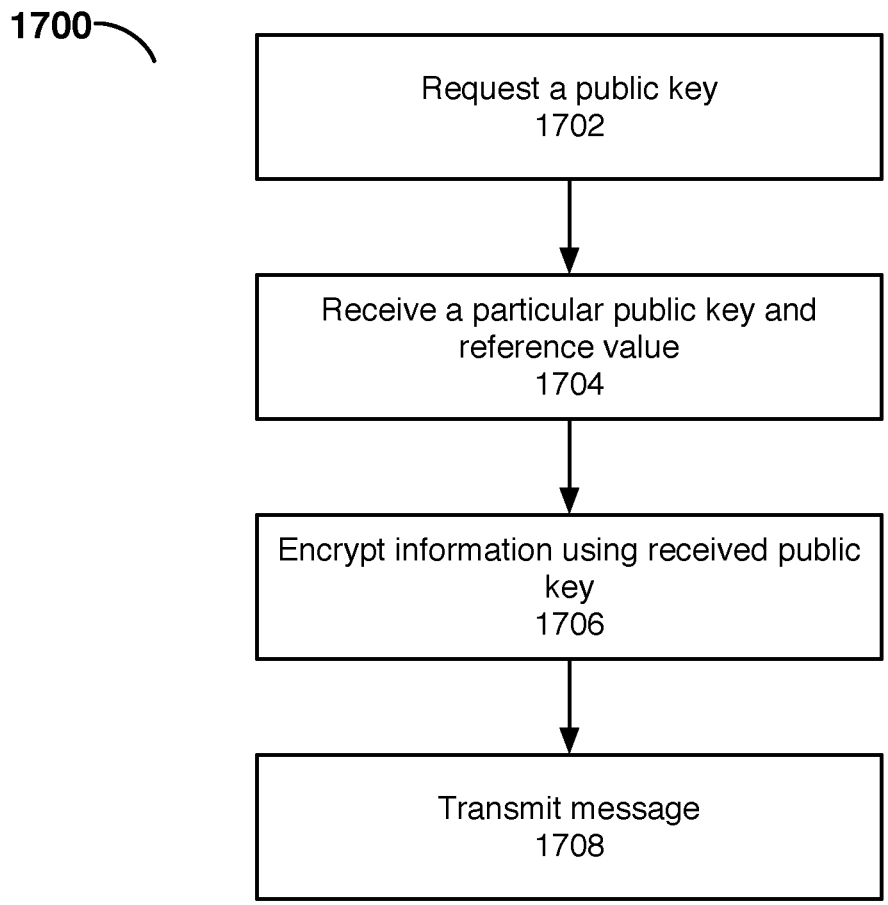
FIG. 17 illustrates an example of a process for sending a message.

FIG. 17 illustrates another example of a process for sending a message. In some embodiments, process 1700 is performed by device 118 ("Bob"). Process 1700 begins at block 1702 when device 118 requests a public key associated with an intended recipient ("Alice") from platform 120 (and after any applicable privacy checks have been performed). If multiple public keys are present for Alice, the platform will preferentially select (whether randomly, sequentially, or by any other appropriate selection technique) one of the non-reserve keys, and delete the selected key in an atomic operation in conjunction with sending the selected key to device 118. As will be described in more detail below, if only one public key is present for Alice (i.e., only the reserve key remains in the pool), platform 120 will send the reserve key to device 118, but will not delete the reserve key from platform 120 until the reserve key is replaced with a new key designated as the reserve.

In block 1704, device 118 receives a public key from platform 120 along with the reference value associated with the key. In block 1706, device 118 may use the received public key to encrypt information, such as a message or other information (e.g., a symmetric key that was used to encrypt the message). The key reference value associated with the received public key is included in the message metadata or otherwise incorporated into the message payload.

Finally, at block 1708, device 118 sends the message to Alice, via security platform 120. Alice's device(s) need not be online (e.g., connected to platform 120) at the time Bob composes and/or sends messages to her.

Figure 18:
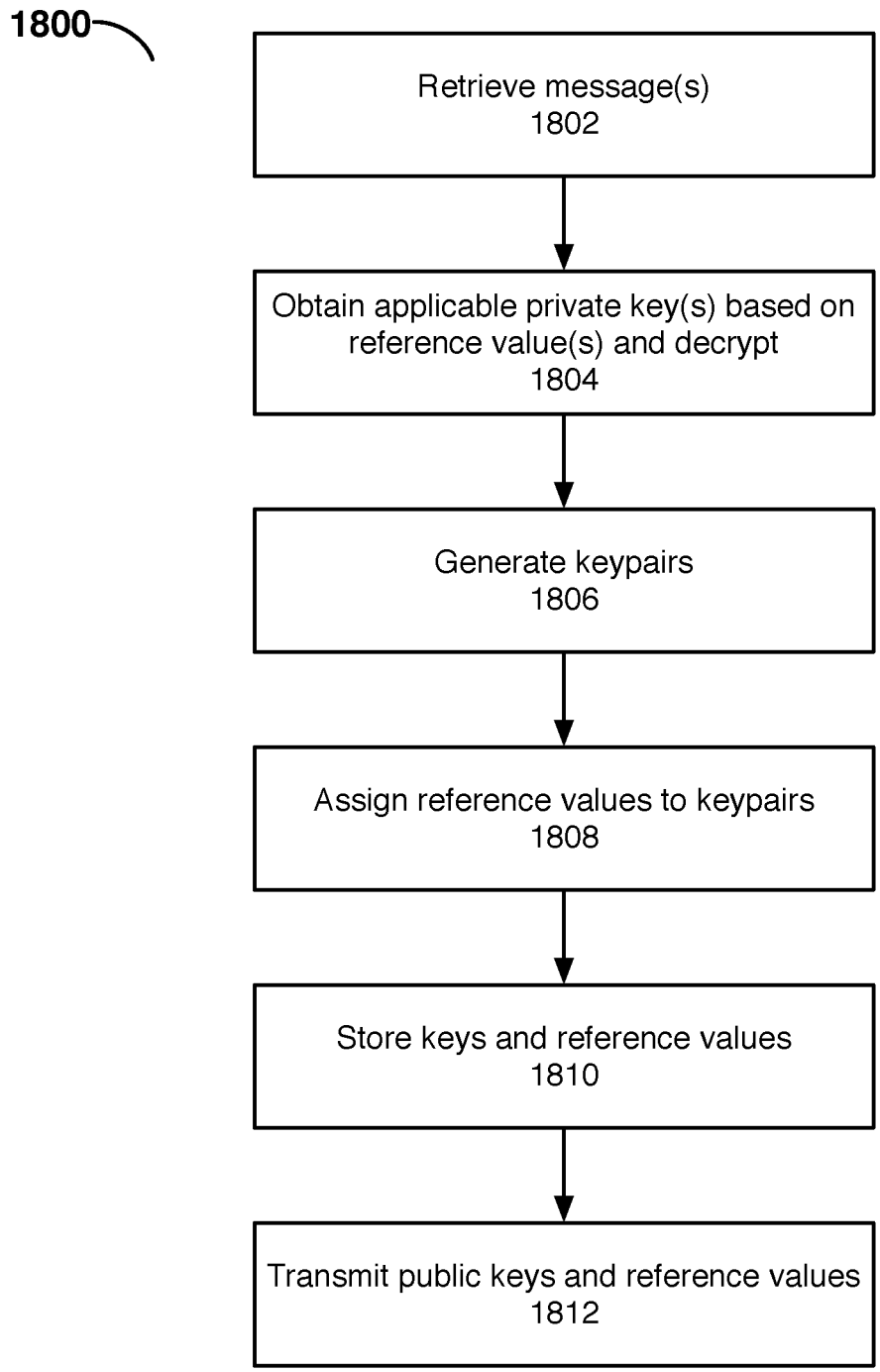
FIG. 18 illustrates an example of a process for performing a synchronous key cache update.

FIG. 18 illustrates an example of a process for performing a synchronous key cache update. In some embodiments, process 1800 is performed by device 116 (e.g., when Alice connects to platform 120 to retrieve messages). The process begins at block 1802 when device 116 connects to platform 120 and retrieves one or more messages.

For each message retrieved in block 1804, the respective key reference value included in the respective message as metadata may be read and used to retrieve the appropriate private key (i.e., having the key reference value) from local storage on device 116 to decrypt the message(s).

In block 1806, device 116 generates additional keypairs to replenish public keys used from the pool stored on platform 120. The number of keys to be generated can be determined in a variety of ways. As one example, device 116 can generate a number of new keypairs equal to the number of messages she received at 1802. As another example, device 116 can be instructed (whether by platform 120 or local instructions) to generate the lesser of:

A: (the number of messages downloaded at 1802\*V), where (V) is a variable impacting the desired expansion rate of the server cache size (e.g. 0.9); or B: the initialization value (e.g., 50 keys).

In block 1808, reference values may be assigned to each of the keypairs generated at 1806. The reference values may uniquely identify each of the key pairs.

In block 1810, the private key portion of the key pairs (i.e., the new private keys) and associated reference values are securely stored locally on device 116. For example, the private keys may be inserted into a database resident on device 116 and secured using the password selected by Alice at 210 in process 200.

Finally, at block 1812, the public key portion of the key pairs (i.e., the new public keys) and associated reference values may be securely transmitted to platform 120. If Alice's reserve key was not depleted, the key originally designated as her reserve key remains present on platform 120 and remains designated as the reserve key. However, if Alice's reserve key was depleted (e.g., because Bob and/or other users of platform 120 sent Alice more than fifty messages prior to her connecting to platform 120), a flag may be set on platform 120 indicating that, in conjunction with her next execution of process 1800 (or portions thereof, as applicable), a new key should be designated as the reserve key, and the existing reserve key be destroyed. Additional actions can also be taken (e.g., by platform 120) in response to Alice depleting her key pool, such as by increasing the size of her pool.

Thus, according to the above-described example, the first 49 messages addressed to Alice would make use of those public keys in her pool not designated as the reserve key. Any additional messages sent to Alice before she can replenish her pool will all make use of her reserve public key (i.e., messages 50, 51, and 52—whether from Bob or others, will all make use of the same public key for Alice—her reserve key).

Figure 19:
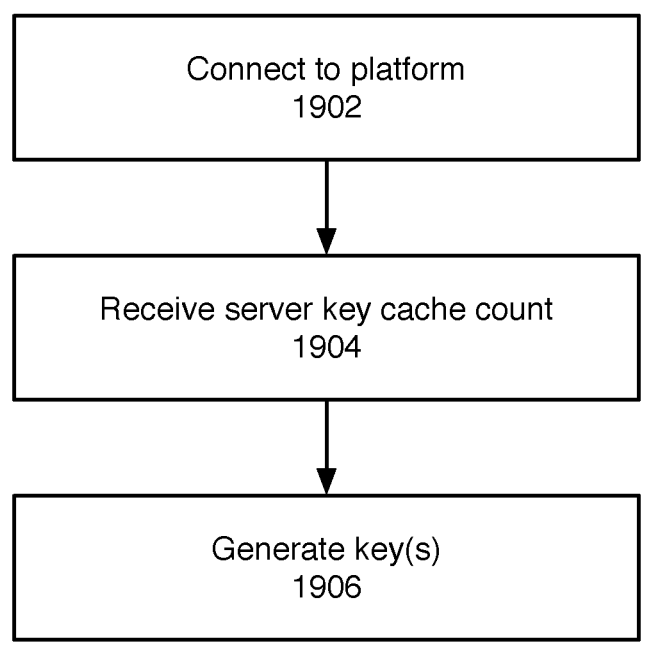
FIG. 19 illustrates an example of a process for performing an asynchronous key cache update.

FIG. 19 illustrates an example of a process for performing an asynchronous key cache update. According to some embodiments, process 1900 may be performed by device 116 periodically. Process 1900 begins when device 106 connects to platform 120. The connection can be periodic (e.g., once a day, once an hour, etc.) and can also be in response to triggering events (e.g., powering on device 116, connecting to network 112, etc.).

At block 1904, the device may receive the current server key cache count (i.e., the number of keys presently in the platform's pool for the user). At block 1906, the device may generate an appropriate number of keypairs, and their corresponding reference values, and stores/transmits them in accordance with the techniques described above. Further, in the event the server key cache count is zero (i.e., the reserve key is being used by platform 120 due to key pool depletion), one of the newly generated keys will be designated by the server as a replacement reserve key and the old reserve key will be destroyed.

I. Mutual Privacy Management

Traditional messaging systems typically allow all users of the system to generate and send a message to an arbitrary recipient. If the recipient does not want to receive messages, the recipient must either rely on spam filters or delete the messages after they arrive, as applicable. The sender in a traditional system may not be prevented from sending messages to a recipient that does not wish to receive messages, thus wasting money, creating congestion on the network(s), wasting bandwidth, wasting processing power, and annoying the recipient, etc.

In contrast, the techniques described herein and in U.S. Ser. No. 14/314,0221, entitled "Mutual Privacy Management," the entirety of which is incorporated by reference herein in its entirety, enable users of platform to edit "privacy" lists, which allow would-be recipients to control from whom they receive messages. In various embodiments, the user's privacy list is stored in database 130 (e.g., in encrypted form, with username entries stored as hashes), and is globally applied across all of the user's devices (where the user has multiple devices configured to use platform 120). As will be described in more detail below, in some embodiments the privacy settings are "mutual," meaning that if a first user chooses not to receive messages from a second user, the first user will symmetrically be unable to send messages to the second user. In various embodiments, users are able to select from, and switch between, one of two privacy modes: a "block mode" and a "whitelist mode." Based on which mode the user is in, the user's privacy list will have different effects. In some embodiments, instead of having a single list (treated differently based on which mode the user is in), the user has a respective list for a respective mode. As one example, where platform 120 may be operated on behalf of an entity such as a company or a school, certain user accounts (e.g., "announcements" or "campus policy") can be included in a universal whitelist, applicable to all users irrespective of individual user settings. In such a scenario, employees or student may be able to operate in allow- or block-mode, and make individual choices about which usernames to include in their individual privacy list. In various embodiments, the user can only be in one privacy mode at a time thereby preventing the user from inadvertently misconfiguring the user's settings to prevent all users of the system from messaging the user.

Figure 20:
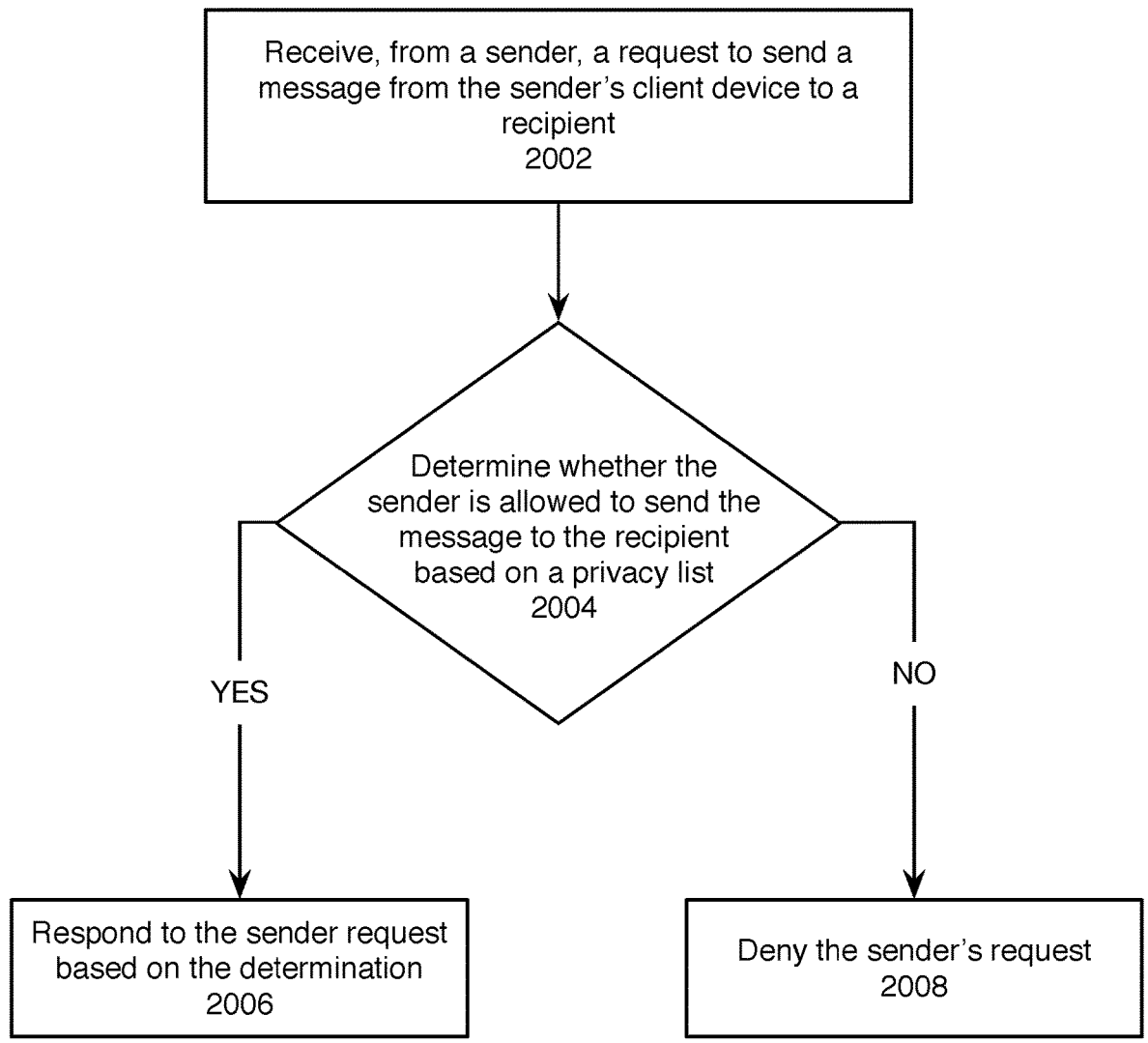
FIG. 20 illustrates an example of a process for determining whether to allow a message to be sent.

FIG. 20 illustrates an example of a process for determining whether to allow a message to be sent. In various embodiments, process 2000 is performed by platform 120. The process begins at block 2002 when a request is received, from a sender, to send a message to a recipient. As one example, such a request is received at block 2002 when Alice enters Bob's name into region 302 of interface 300, or presses send button 314, as applicable (e.g., when Alice's app 146 requests Bob's public key from platform 120).

In block 2004, a determination is made as to whether the sender is allowed to send the message to the recipient based on a privacy list. For example, platform 120 may determine whether Bob is in block mode or in whitelist mode in block 2004. Platform 120 may also determine whether Bob's privacy list contains an entry for Alice in block 2004. In some embodiments, platform 120 may also determine whether Alice is in block mode or whitelist mode. Further, platform 120 may determine whether Alice's privacy list contains an entry for Bob.

If it is determined that the sender is allowed to send the message to the recipient in block 2004, the sender receives a response from the platform 120 providing the recipient's information in block 2006. For example, platform 120 may send the recipient's public information, including a public key, reference value, deviceID(s), etc., to the sender. Conversely, if it is determined that the sender is not allowed to send a message to the recipient, the sender may receive a notification indicating that the sender's request is denied in block 2008. According to this example, platform 120 does not provide the public key of the recipient to the sender. In various embodiments, an applicable rejection message may be displayed to the sender.

Figure 21:
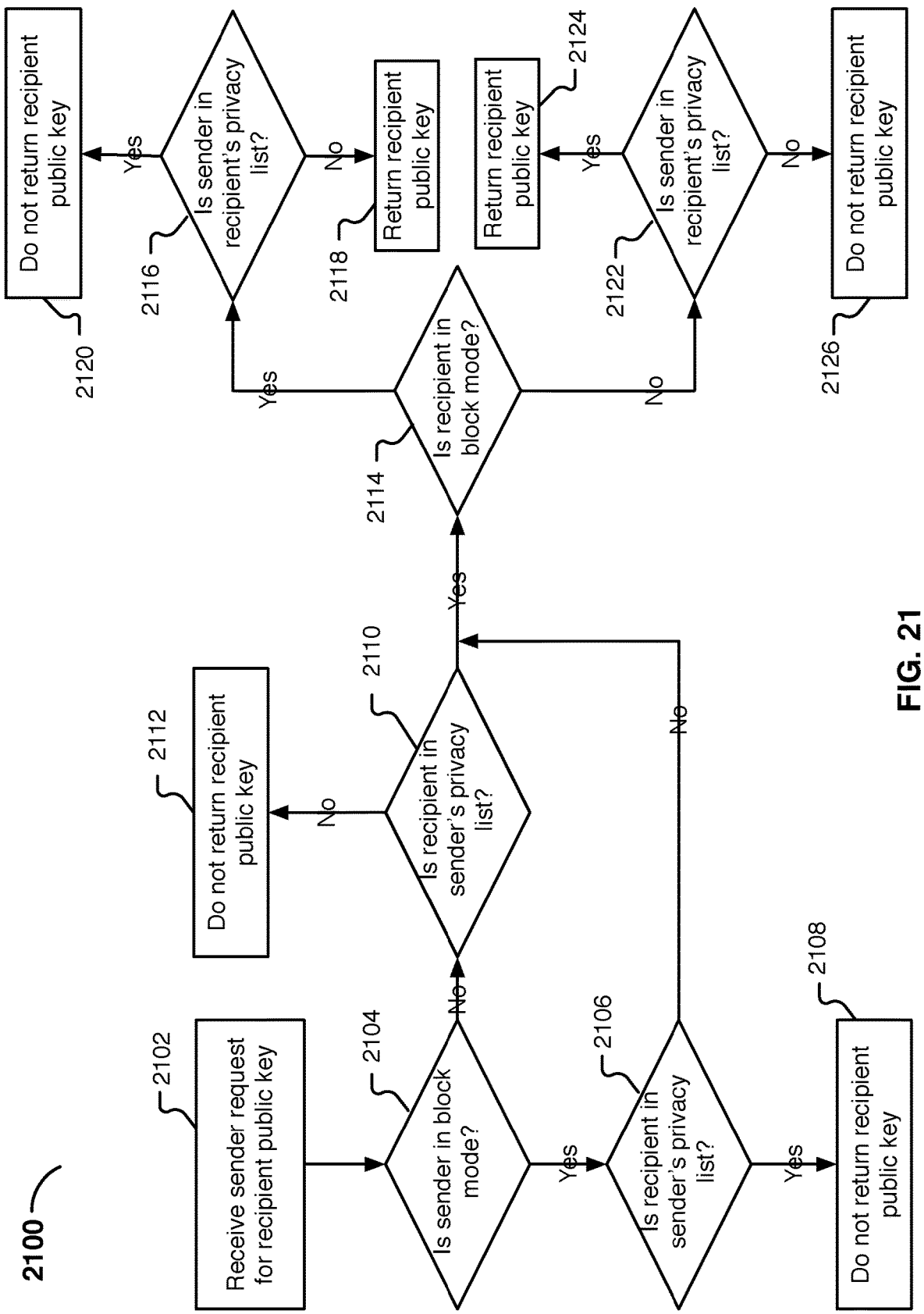
FIG. 21 illustrates an example of a process for determining whether to allow a message to be sent.

FIG. 21 illustrates an example of a process for determining whether to allow a message to be sent. In various embodiments, process 2100 is performed by platform 120. Process 2100 begins at block 2102 when a request is received from a sender for a public key of a recipient. For example, such a request is received at 2102 when Alice enters Bob's name into region 302 of interface 300.

In block 2104, a determination may be made as to whether the sender is in block mode. As one example, platform 120 may examine database 130 for information about which privacy mode the sender is in in block 2104. In various embodiments, a user may default to being in the block mode with an empty privacy list. As mentioned above, a user may change which mode the user is in and add and/or remove other users from a privacy list. Updates to the privacy list may be transmitted to platform 120, which, in turn, updates database 130 and its encrypted entries.

If the sender is in block mode, a determination may be made at block 2106 as to whether the recipient is in the sender's privacy list. This indicates that the sender is attempting to send a message to a recipient that the sender has blocked messages from. Accordingly, in some embodiments due to the mutual/symmetric nature of privacy controls, the sender will be prevented from sending the message to the recipient (i.e., the sender will not be sent the recipient's public key) in block 2108.

If, however, the sender is in whitelist mode, a determination may be made at block 2110 as to whether the recipient is in the sender's privacy list. If the recipient is not in the sender's privacy list, this indicates that the sender has not whitelisted the recipient as someone who can message the sender. Accordingly, in some embodiments due to the mutual/symmetric nature of privacy controls, the sender will be prevented from sending the message to the recipient (i.e., the sender will not be sent the recipient's public key) at block 2112.

Regardless of which mode the sender is in, process 2100 next examines the recipient's privacy settings. In particular, a determination is made as to whether the recipient is in block mode in block 2114. If the recipient is in block mode, a determination is made as to whether the sender is in the recipient's privacy list at block 2116. If the sender is not in the recipient's privacy list, the sender will be provided with the recipient's public key at block 2118 so that the sender may send a message to the recipient. If the sender is in the recipient's privacy list, the sender will not receive the recipient's public key at block 2120 and will not be able to send a message to the recipient.

In the event the recipient is not in block mode, a determination is made in block 2122 as to whether the sender is in the recipient's privacy list. If the sender is in the recipient's privacy list, the sender will be provided with the recipient's public key in block 2124 such that the sender may send a message to the recipient. However, if the sender is not in the recipient's privacy list, the sender will not receive the recipient's public key at block 2126. Accordingly, the sender will not be able to send a message to the recipient.

As explained above, in the event the sender is unable to obtain the recipient's public key due to privacy settings, the sender can be presented with an appropriate message in the secure messaging application.

J. In-Band Identity Verification and Man-in-the-Middle Defense

Techniques for generating dynamic verification content are described in in U.S. Ser. No. 14/749,575, entitled "In-Band Identity Verification and Man-in-the-Middle Defense," the entirety of which is incorporated by reference herein in its entirety.

Dynamic verification content may include reading a representation of a public key that may be blended with additional dynamic information, such as the would-be-verified person's name and current date/time. A variety of actions can be taken in response to a verification process being performed. For example, if a verification by a first user of a second user has not been performed or has expired, the first user can be given the option to receive no indication of the lack of verification, to receive a warning, or to block communications to/from the second user until successful verification takes place.

Suppose that one user (hereinafter referred to as Robert) of platform 120 would like to exchange messages with his friend, Chris. Robert has a secure messaging application installed on his smartphone, and Chris is personally known to Robert. Robert believes that Chris's username on platform 120 is "Chris," and so he sends an initial message to Chris (e.g., using an embodiment of interface 300) with a message of "Hi, this is Robert," and a supplied username of "Chris" as the recipient. Robert receives a response back that says, "Hi, Robert!" The user with whom Robert is corresponding might be Robert's friend, Chris. However, the user might instead be an imposter, another person coincidentally named Chris who also knows someone named Robert, or is interested in meeting someone new.

Using techniques described herein, key signature verification (also referred to herein as fingerprint verification) may be performed between Robert and Chris, as well as an audiovisual physical verification, so that Robert can confirm that he is securely communicating with his friend, Chris. For example, Robert can ask Chris to verify himself Robert can likewise be asked by Chris to verify himself, and/or Robert can also spontaneously send a volunteered verification of himself to Chris. As will be described in more detail below, the verification can include a human-generated content aspect (e.g., an audiovisual recording of the person to be verified) and a digital content aspect (e.g., the incorporation of one or more digital fingerprints or representations thereof). As one example, Chris can be guided to record a video in which he is prompted to read out loud a fingerprint or other representation corresponding to a public key associated with Chris. Through this approach, Robert can verify both that the Chris with whom he is communicating is in fact his friend Chris (e.g., can verify to his satisfaction Chris's identity), and also that keys purporting to belong to Chris (e.g., obtained from platform 120 and used in accordance with the principle of first trust) in fact do. That is, both parties can be assured that no man-in-the-middle attack, or other tampering with the communications, has occurred.

The identity verification is performed individually (e.g., one for each user entry in Robert's friend list, address book, etc.). In some embodiments, the status of a given contact as being verified by a user is stored on the user's device, inside a database resident on the device and secured using an AES key derived from the password selected by Alice at portion 210 in process 200.

Verification can be performed at a variety of times. For example, verification may be performed the time a contact is initially added as a contact, the first time a user sends a message to that contact, on demand (either spontaneously by someone sending their own verification, or in response to a request made by the other user), or otherwise initiated. Re-verification can be requested of any contact at any time. Re-verification can also be automatically required after a period of time has elapsed. For example, Robert can adjust a setting in his app that forces a re-verification to take place every six months. In that scenario, once six months have elapsed after a given verification has been performed, app removes the verified status associated with the verified contact (e.g., in the secure database stored on his device), and Robert can re-initiate a verification of that contact.

In some embodiments, where a user has multiple devices, any verification performed on one device can propagated between the verifier's devices. One way to accomplish this is for the local secure database used by the app to be securely backed up (e.g., in encrypted form) on platform 120. When Robert enrolls a second device with platform 120, a copy of the secure database (or portions of the contents, as applicable) can be downloaded to the second device. Security platform 120 can similarly be used to keep the data in sync, for example, with each of Robert's devices pushing updates to the backup stored on platform 120 whenever a verification change has been made. In some embodiments, Robert must independently verify contacts on each of his devices. In other embodiments, whether or not verifications are propagated is configurable by Robert or an administrator, such as when the app is used in an enterprise context).

Identity verification techniques described herein can be used in conjunction with other techniques described herein (e.g., secure messaging provided by platform 120), and can also be incorporated into other systems (e.g., other than platform 120 or embodiments thereof). As will be described in more detail below, a digital fingerprint component and an audiovisual component can be combined in a verifier's display. The audiovisual portion is tamper-resistant, allowing it to be transmitted in-band, even if the sender (person to be verified) or receiver (verifier) is currently being subjected to a man-in-the-middle attack.

Figure 22:
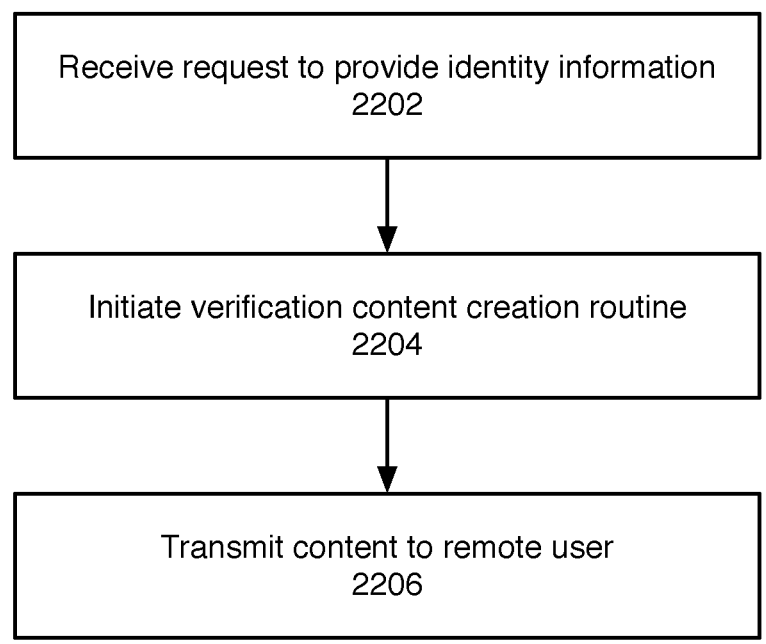
FIG. 22 illustrates an embodiment of a process for generating identity verification content.

FIG. 22 illustrates an embodiment of a process for generating identity verification content. In various embodiments, process 2200 is performed by an application installed on a client device. The process begins at 2202 when a verification request is received. The request can be received in a variety of ways. As one example, when Robert spontaneously initiates a verification of himself to the user, "Chris," a verification request may be received at block 2202. As another example, Robert may request the user "Chris" to verify himself to Robert, thereby prompting a control message to be sent to Chris. When Chris opens the message, he is presented with the option of performing a verification by clicking on a "yes" button or otherwise indicating agreement to proceed.

In block 2204, a verification routine may be initiated. For example, where Robert has decided to spontaneously verify himself to Chris, the verification routine may be initiated at 2204 when Robert commences reading from a script during an audiovisual recording. Similarly, where Chris is verifying himself in response to a request from Robert, the verification routine may be initiated when Chris selects a method of verification option from an interface. Finally, at block 2206, a result of the verification routine is transmitted to a remote user. Robert is spontaneously verifying himself to Chris, Robert's audiovisual recording may be packaged in a DSB (as explained above) and transmitted to Chris (e.g., via platform 120) at block 2206. Where Chris has accepted a request from Robert to verify himself, Chris's audiovisual recording may be packaged into a DSB and transmitted to Robert at block 2206. Where Chris (or Robert) chooses to verify himself using an SMS or email instead of via an audiovisual recording, block 2206 occurs when the applicable SMS or email message is sent.

Figure 23:
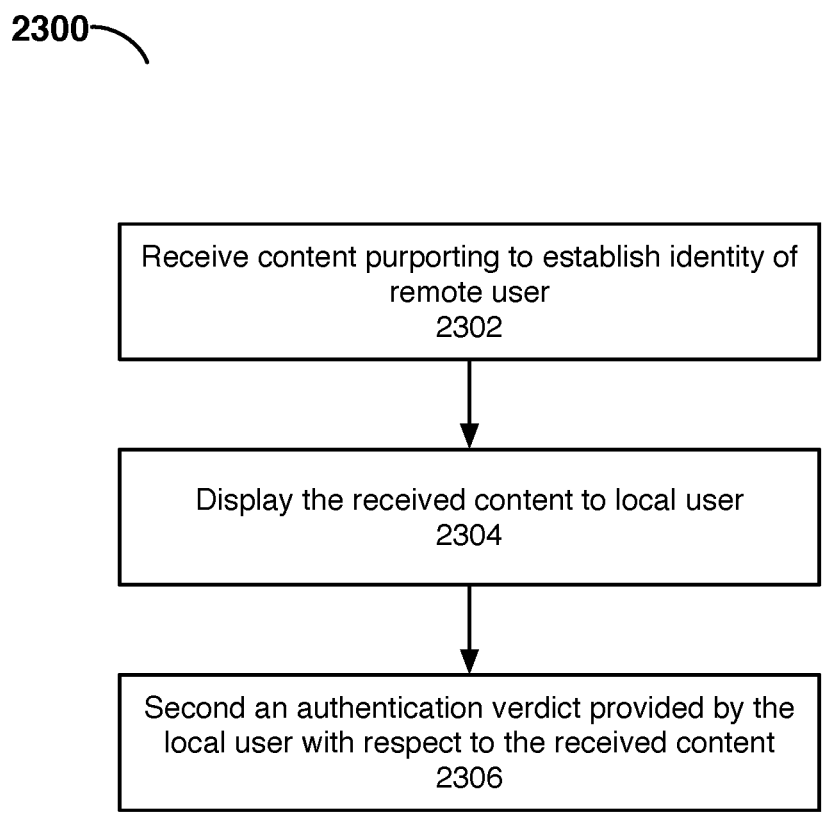
FIG. 23 illustrates an embodiment of a process for verifying identity verification content.

FIG. 23 illustrates an embodiment of a process for verifying identity verification content. The process begins at 2302 when content purporting to establish an identity of a remote user is received. As one example, when Robert chooses to spontaneously verify himself to Chris, Chris receives such content at 2302 when he obtains Robert's audiovisual recording, for example, by downloading a DSB containing the recording. As another example, if Robert requests that Chris verify himself, Robert receives such content at 2302 when Chris responds with an audiovisual recording, for example, generated using an embodiment of process 2100, an SMS, or an email. At block 2304, the received content is displayed to the local user. Returning to the example where Robert is spontaneously verifying himself, Chris downloads the DSB prepared by Robert and extracts the audiovisual attachment in block 2304. The audiovisual recording is played for Chris, and Chris's app displays, for example—as an overlay on the audiovisual content, a cryptographic hash of Robert's public key that was originally obtained from platform 120. The overlay can be positioned to appear on top of the recorded video. Alternatively, the overly may above or below the video or partially overlapping the video. Chris scrutinizes the biometric attributes present in the audiovisual content confirming Robert's identity to his satisfaction. The biometric attributes may include, for example, Robert's voice and likeness, as well as other probative information—such as the room in which Robert recorded the video, the presence of Robert's pets or family members, desk props, etc.

Chris also ensures that the displayed hash value of Robert's key obtained from the platform 120 matches the value that Robert communicates in the video. As mentioned above, if the verification is approved by the viewer, the viewer can indicate that the user should be verified. For example, a "confirm" button may be clicked and a verification status associated with that user may be changed from not verified to verified and stored in a secure database local to the verifier's device. If the viewer is not satisfied with the identification, the viewer can similarly click a "deny" or other appropriate button and the user's verification status can be set to "not verified" or another appropriate status. As mentioned above, re-verification can be performed at any time, so in the event an erroneous choice is made (e.g., Robert erroneously indicates that Chris is not Chris by clicking the wrong button), the verification process can be repeated, allowing for the status to be corrected.

Figures 24A, 24B:
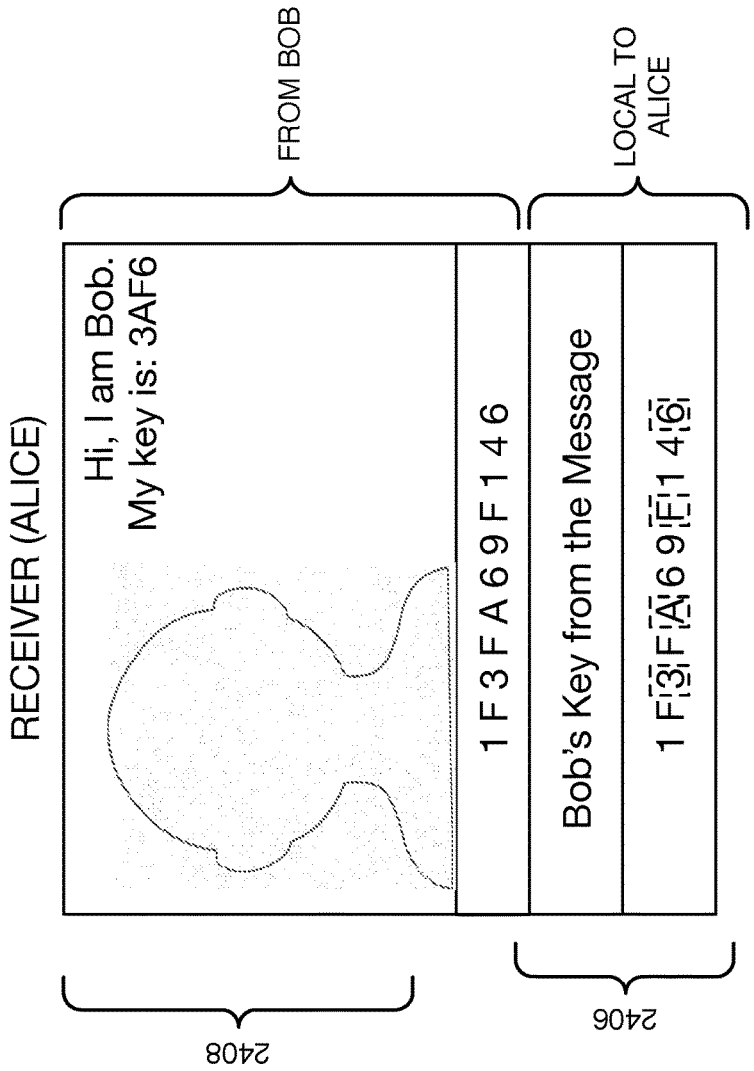
FIGS. 24A and 24B illustrates an embodiment of interfaces for identity verification.

Alternate examples of interfaces for generating and viewing verification video and other data are shown in FIGS. 24A and 24B, respectively. FIG. 24A is an example of an interface shown to the person recording the video (in this example, Bob). The sub-portion of Bob's fingerprint to be spoken out-loud is "3AF6" and is indicated to Bob both in conjunction with a dynamic script (in region 2402) and by an indication of where, within the whole fingerprint, the sub-portion was extracted (2404). Alice's app has a key stored for Bob and is able to display the local copy of his stored key (shown in the bottom portion of Figure of 24B at 2406) against the verification transmission shown in the top portion of FIG. 24B at 2408. In some embodiments, Alice is given controls, such as a set of checkmarks that she can tick as she verifies Bob's information. In some embodiments, Alice is required to re-enter her app password in conjunction with ticking the checkmarks.

In summary, the present disclosure is describes a system that includes a processor a memory coupled to the processor and configured to provide the processor with instructions to:

receive an encrypted digital security bubble encapsulation from a sender, wherein the encrypted digital security bubble encapsulation includes an encrypted message and an encrypted first key;

decrypt the encrypted digital security bubble encapsulation;

decrypt the encrypted first key;

decrypt the encrypted message using the first key to produce a decrypted message; and analyze the decrypted message to determine whether it is compliant with one or more corporate policies; and provide the encrypted digital security bubble encapsulation to one or more recipients when the decrypted message is determined to be compliant with one or more corporate policies; and/or store the decrypted message in a retention database for a predetermined period of time, wherein the retention database is configured to encrypt the decrypted message with a unique key; and/or send an acknowledgement to the sender indicating that the encrypted digital security bubble encapsulation has been provided to the one or more recipients; and/or block delivery of the encrypted digital security bubble encapsulation to one or more recipients when the decrypted message is determined to be non-compliant with one or more corporate policies; and/or notify the sender that the message was not delivered to one or more recipients due to a compliance violation; and/or send a negative acknowledgement to the sender when the decrypted message is determined to be non-compliant with one or more corporate policies; and/or transmit instructions to the sender to delete the non-compliant message; and/or send an acknowledgement to the sender device to transmit the encrypted digital security bubble encapsulation to the one or more recipients when the decrypted message is determined to be compliant with one or more corporate policies.

The present disclosure also describes a method that includes receiving an encrypted digital security bubble encapsulation from a sender, wherein the encrypted digital security bubble encapsulation includes an encrypted message and an encrypted first key;

decrypting the encrypted digital security bubble encapsulation;

decrypting the encrypted first key;

decrypting the encrypted message using the first key to produce a decrypted message; and analyzing the decrypted message to determine whether it is compliant with one or more corporate policies; and providing the encrypted digital security bubble encapsulation to one or more recipients when the decrypted message is determined to be compliant with one or more corporate policies; and/or storing the decrypted message in a retention database for a predetermined period of time, wherein the retention database is configured to encrypt the decrypted message with a unique key; and/or sending an acknowledgement to the sender indicating that the encrypted digital security bubble encapsulation has been provided to the one or more recipients; and/or blocking delivery of the encrypted digital security bubble encapsulation to one or more recipients when the decrypted message is determined to be non-compliant with one or more corporate policies; and/or notifying the sender that the message was not delivered to one or more recipients due to a compliance violation; and/or sending a negative acknowledgement to the sender when the decrypted message is determined to be non-compliant with one or more corporate policies; and/or transmitting instructions to the sender to delete the non-compliant message; and/or sending an acknowledgement to the sender device to transmit the encrypted digital security bubble encapsulation to the one or more recipients when the decrypted message is determined to be compliant with corporate policies.

The present application also describes a computer program product embodied on a non-transitory computer readable storage medium that includes computer instructions for:

receiving an encrypted digital security bubble encapsulation from a sender, wherein the encrypted digital security bubble encapsulation includes an encrypted message and an encrypted first key;

decrypting the encrypted digital security bubble encapsulation;

decrypting the encrypted first key;

decrypting the encrypted message using the first key to produce a decrypted message; and analyzing the decrypted message to determine whether it is compliant with one or more corporate policies; and providing the encrypted digital security bubble encapsulation to one or more recipients when the decrypted message is determined to be compliant with one or more corporate policies; and/or storing the decrypted message in a retention database for a predetermined period of time, wherein the retention database is configured to encrypt the decrypted message with a unique key; and/or sending an acknowledgement to the sender indicating that the encrypted digital security bubble encapsulation has been provided to the one or more recipients; and/or block delivery of the encrypted digital security bubble encapsulation to one or more recipients when the decrypted message is determined to be non-compliant with one or more corporate policies; and/or notifying the sender that the message was not delivered to one or more recipients due to a compliance violation; and/or sending a negative acknowledgement to the sender when the decrypted message is determined to be non-compliant with one or more corporate policies; and/or transmitting instructions to the sender to delete the non-compliant message; and/or sending an acknowledgement to the sender device to transmit the encrypted digital security bubble encapsulation to the one or more recipients when the decrypted message is determined to be compliant with corporate policies.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system comprising:
a secure communication platform for facilitating an exchange of encrypted communications between client devices, wherein the secure communication platform comprises:
one or more interfaces configured to enable communications between client devices;
a compliance engine configured to analyze communications to determine whether one or more communications comply with corporate policies; and
an audit controls module configured to:
integrate with existing audit controls via an interface, wherein the interface comprises an application programming interface;
record and examine encrypted communications to determine whether a security violation has occurred; and
query a retention database to recover one or more encrypted communications;
a compliance server configured to communicate with the compliance engine, wherein the compliance server is a virtual compliance server; and
a retention server comprising the retention database configured to store communications exchanged via the secure communication platform.

2. The system of claim 1, wherein the encrypted communications comprise a time-to-live value.

3. The system of claim 2, wherein the time-to-live value is a predetermined time frame to ensure regulatory compliance.

4. The system of claim 2, wherein the retention server is configured to delete communications at an expiration of the time-to-live value.

5. The system of claim 1, wherein the secure communication platform is located on an enterprise server.

6. The system of claim 1, wherein the compliance server is a data leakage prevention system.

7. The system of claim 1, wherein the secure communication platform is further configured to decrypt encrypted communications.

8. The system of claim 7, wherein the compliance engine is configured to analyze the decrypted communications.

9. A method comprising:
receiving, by a server executing a secure communication platform for facilitating an exchange of encrypted communications and from a first device, an encrypted communication;
decrypting the encrypted communication;
analyzing the decrypted communication to determine whether the decrypted communication complies with one or more corporate policies;
storing, in a retention database and based on a determination that the decrypted communication complies with one or more policies, the decrypted communication, wherein the retention database is configured to store communications exchanged via the secure communication platform;
providing, to a second device and based on the determination that the decrypted communication complies with one or more policies, the encrypted communication;
sending, to the first device, an acknowledgement that the encrypted communication has been delivered to the second device;
querying the retention database to recover one or more encrypted communications;
examining the one or more encrypted communications to determine whether a security violation has occurred.

10. The method of claim 9, wherein the retention database stores the decrypted communication for a predetermined period of time.

11. The method of claim 10, wherein the retention database is configured to encrypt the decrypted communication.

12. The method of claim 9, further comprising:
receiving, at the server from a third device, a second encrypted communication;
decrypting the second encrypted communication;
analyzing the second decrypted communication to determine whether the second decrypted communication complies with one or more corporate policies; and
blocking, based on a determination that the decrypted communication fails to comply with the one or more corporate policies, delivery of the second encrypted communication.

13. The method of claim 12, further comprising:
notifying, the third device, that the second encrypted communication was not delivered to due to a compliance violation.

14. One or more non-transitory media storing instructions that, when executed, cause a server, executing a secure communication platform for facilitating an exchange of encrypted communications, to perform steps comprising:
receiving, by the server and from a first device, an encrypted communication;
decrypting the encrypted communication;
analyzing the decrypted communication to determine whether the decrypted communication complies with one or more corporate policies;
storing, in a retention database and based on a determination that the decrypted communication complies with one or more policies, the decrypted communication, wherein the retention database is configured to store communications exchanged via the secure communication platform; and
providing, to a second device and based on the determination that the decrypted communication complies with one or more policies, the encrypted communication;
sending, to the first device, an acknowledgement that the encrypted communication has been delivered to the second device;
querying the retention database to recover one or more encrypted communications; and
examining the one or more encrypted communications to determine whether a security violation has occurred.

15. The one or more non-transitory media of claim 14, wherein the retention database stores the decrypted communication for a predetermined period of time.

16. The one or more non-transitory media of claim 15, wherein the retention database is configured to encrypt the decrypted communication.

17. The one or more non-transitory media of claim 14, further comprising instructions that cause the server to perform steps comprising:
- receiving, from a third device, a second encrypted communication;
- decrypting the second encrypted communication;
- analyzing the second decrypted communication to determine whether the second decrypted communication complies with one or more corporate policies;
- blocking, based on a determination that the decrypted communication fails to comply with the one or more corporate policies, delivery of the second encrypted communication; and
- notifying, the third device, that the second encrypted communication was not delivered to due to a compliance violation.

* * * * *